United States Patent
Kimura

(10) Patent No.: US 10,086,757 B2
(45) Date of Patent: Oct. 2, 2018

(54) DISPLAY DEVICE

(71) Applicant: TOYOTA JIDOSHA KABUSHIKI KAISHA, Toyota-shi, Aichi-ken (JP)

(72) Inventor: Kenji Kimura, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/436,059

(22) Filed: Feb. 17, 2017

(65) Prior Publication Data

US 2017/0240109 A1 Aug. 24, 2017

(30) Foreign Application Priority Data

Feb. 23, 2016 (JP) ................. 2016-032325

(51) Int. Cl.
*G01G 1/16* (2006.01)
*B60Q 9/00* (2006.01)
(Continued)

(52) U.S. Cl.
CPC .................. *B60Q 9/00* (2013.01); *B60R 1/00* (2013.01); *G01S 13/931* (2013.01); *G08G 1/16* (2013.01);
(Continued)

(58) Field of Classification Search
CPC ...... B60R 2001/1215; B60R 2300/304; B60R 2300/307; B60R 2300/8093;
(Continued)

(56) References Cited

U.S. PATENT DOCUMENTS

2008/0180257 A1 7/2008 Omi et al.
2009/0085774 A1 4/2009 Yasuhara et al.
(Continued)

FOREIGN PATENT DOCUMENTS

JP 2008-186181 A 8/2008
JP 2009-86839 A 4/2009
(Continued)

OTHER PUBLICATIONS

Yasuhiro Seya et al.: "Attentional capture without awareness in complex visual tasks", Perception, 2012, vol. 41, pp. 517-531.
(Continued)

*Primary Examiner* — Benyam Haile
(74) *Attorney, Agent, or Firm* — Sughrue Mion, PLLC

(57) ABSTRACT

A display device includes: a display unit configured to display an image on a windshield of a host vehicle; and an electronic control unit configured to: recognize other vehicles; determine whether a squeezing candidate vehicle having a possibility to squeeze before the host vehicle presents; calculate, when the squeezing candidate vehicle is determined to present, a first appearance interval that increases according to a time elapsed from a time when the squeezing candidate vehicle is last determined to present; and cause the display unit to display a first blinking display when the squeezing candidate vehicle is determined to present. The electronic control unit is configured to reduce a number of blinks of the first blinking display when the first appearance interval is smaller than a first threshold as compared with a case when the first appearance interval is equal to or larger than the first threshold.

8 Claims, 18 Drawing Sheets

(51) Int. Cl.
*G01S 13/93* (2006.01)
*G08G 1/16* (2006.01)
*B60R 1/00* (2006.01)
B60W 30/18 (2012.01)
G01S 13/89 (2006.01)
B60W 30/12 (2006.01)
G02B 27/01 (2006.01)
G01C 21/26 (2006.01)
B60R 1/12 (2006.01)
G01C 21/36 (2006.01)
G01S 13/72 (2006.01)

(52) U.S. Cl.
CPC ...... *G08G 1/167* (2013.01); *B60R 2001/1215* (2013.01); *B60R 2300/307* (2013.01); *B60R 2300/804* (2013.01); *B60W 30/12* (2013.01); *B60W 30/18163* (2013.01); *G01C 21/26* (2013.01); *G01C 21/365* (2013.01); *G01S 13/723* (2013.01); *G01S 13/89* (2013.01); *G02B 27/01* (2013.01)

(58) Field of Classification Search
CPC ........ B60R 2300/205; B60R 2300/301; B60R 2300/305; G02B 27/01; G02B 2027/0138; G01S 13/931; G01S 13/723; G01S 2013/9325; G01S 2013/9353; G01S 2013/9375; G01S 13/89; B60W 30/18163; B60W 2550/308; B60W 30/12; B62D 15/0255; G08G 1/167; G08G 1/16; G01C 21/26; G01C 21/365
See application file for complete search history.

(56) References Cited

U.S. PATENT DOCUMENTS

| | | | |
|---|---|---|---|
| 2009/0243822 A1* | 10/2009 | Hinninger | B60Q 9/008 340/435 |
| 2010/0253539 A1* | 10/2010 | Seder | G01S 13/723 340/903 |
| 2016/0284218 A1 | 9/2016 | Ejiri | |

FOREIGN PATENT DOCUMENTS

| | | |
|---|---|---|
| JP | 2012-050690 A | 3/2012 |
| JP | 2015-99469 A | 5/2015 |
| JP | 2015-102891 A | 6/2015 |
| JP | 2015-138383 A | 7/2015 |
| JP | 2015-194939 A | 11/2015 |
| JP | 2015-219782 A | 12/2015 |

OTHER PUBLICATIONS

Kazuma Ishimatsu et al.:, "Effects of aging on the useful field of view: focusing on traffic safety," Bulletin of the Graduate School of Human Sciences, Osaka University vol. 28, Mar. 2002, pp. 14-36.

* cited by examiner

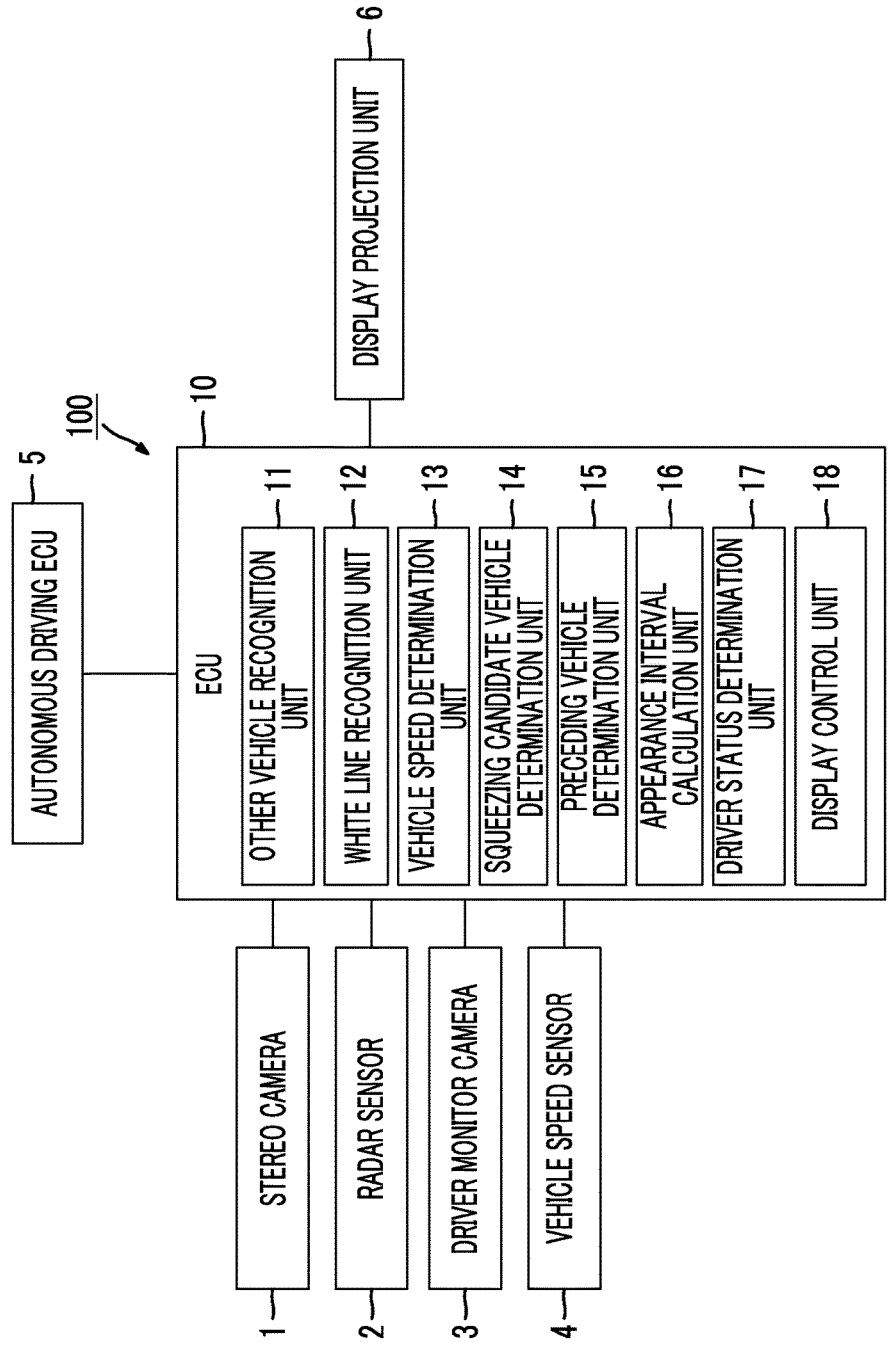

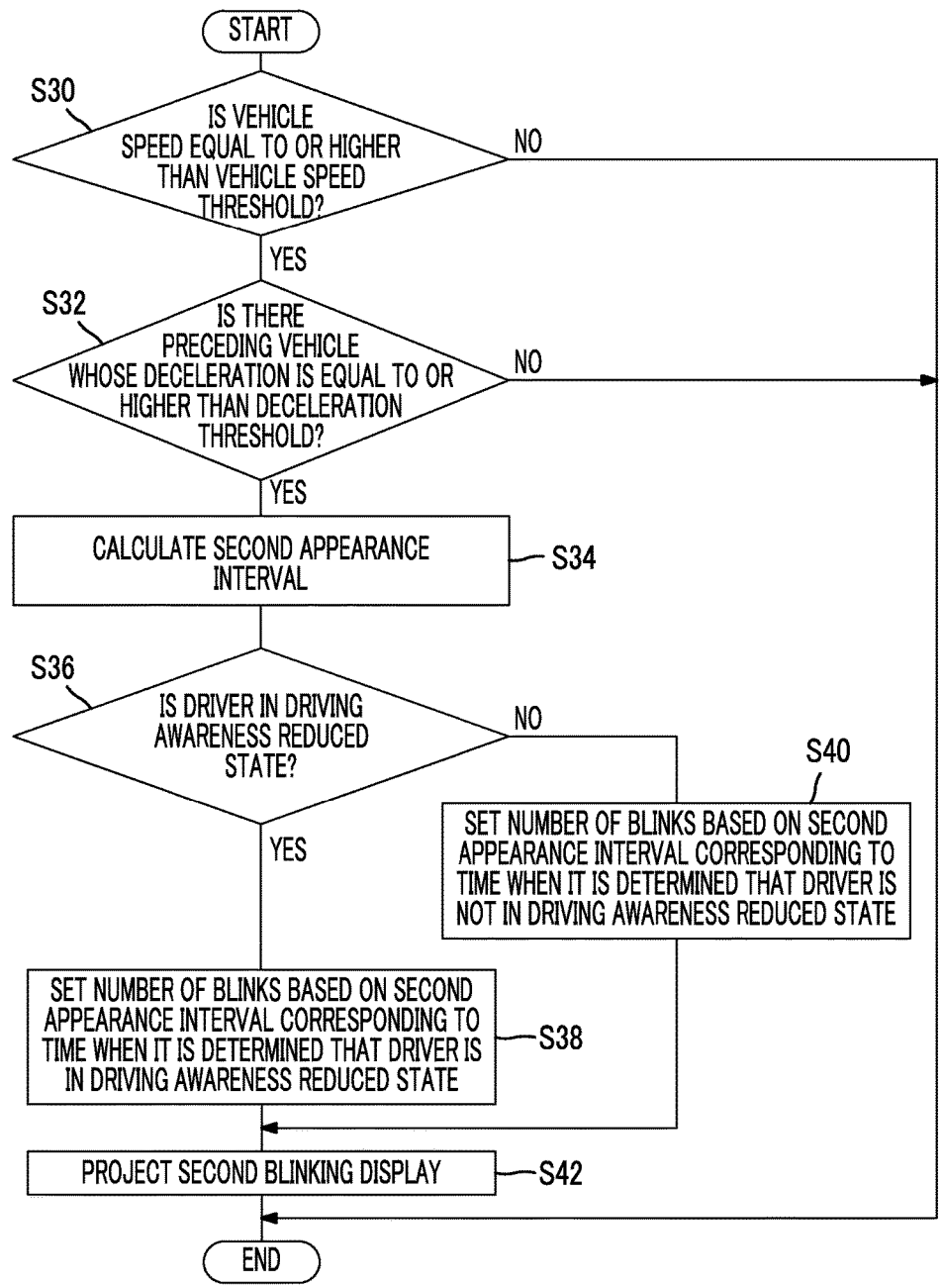

DISPLAY DEVICE

INCORPORATION BY REFERENCE

The disclosure of Japanese Patent Application No. 2016-032325 filed on Feb. 23, 2016 including the specification, drawings and abstract is incorporated herein by reference in its entirety.

BACKGROUND

1. Technical Field

The present disclosure relates to a display device that projects a display on the windshield of a host vehicle.

2. Description of Related Art

As a technical document relating to a display device for projecting a display on the windshield of a host vehicle, Japanese Patent Application Publication No. 2015-138383 (JP 2015-138383 A) is known. This publication describes a device that outputs a visual stimulus display at the left and right positions within the effective visual field of the driver at cyclic intervals to maintain the wakefulness state while avoiding the driving awareness of the driver from being reduced.

SUMMARY

However, the device in the related art described above repeatedly outputs the display at the left and right positions within the effective visual field at a periodic interval regardless of the status of the host vehicle or the driver, sometimes with the possibility that the driver feels bothersome about the display. For this reason, there is room for improvement in the display that is output to prevent the driving awareness of the driver from being reduced.

In view of the forgoing, one aspect of the present disclosure provides a display device capable of reducing the possibility that the driver feels bothersome about the display that is output to prevent the driving awareness of the driver from being reduced.

An aspect of the disclosure provides a display device including: a display unit configured to display an image on a windshield of a host vehicle; and an electronic control unit configured to recognize other vehicles that are present around the host vehicle; determine whether a squeezing candidate vehicle presents ahead of the host vehicle, based on a recognition result of the other vehicles, the squeezing candidate vehicle having a possibility to squeeze before the host vehicle; calculate a first appearance interval when the squeezing candidate vehicle is determined to present, the first appearance interval being an interval that increases according to a time elapsed from a time when the squeezing candidate vehicle is last determined to present; and cause the display unit to display a first blinking display on the windshield when the squeezing candidate vehicle is determined to present, the first blinking display being displayed to alert a driver of the host vehicle to the squeezing candidate vehicle. The electronic control unit is configured to reduce a number of blinks of the first blinking display when the first appearance interval is smaller than a first threshold as compared with a case when the first appearance interval is equal to or larger than the first threshold.

According to the display device in the aspect described above, if it is determined that there is a squeezing candidate vehicle that may squeeze before the host vehicle, the display device projects the first blinking display onto the windshield to alert the driver to the squeezing candidate vehicle, thereby preventing the driving awareness of the driver from being reduced. In addition, this display device projects the first blinking display on the windshield when it is determined that there is a squeezing candidate vehicle, thus reducing that possibility that the driver feels bothersome about the blinking display as compared with the case in which the blinking display is projected at a constant periodic interval regardless of the surrounding environment of the host vehicle. In addition, when the first appearance interval of the squeezing candidate vehicle is smaller than the first threshold, the display device reduces the number of blinks of the first blinking display as compared with the case when the first appearance interval is equal to or larger than the first threshold. Therefore, when the squeezing candidate vehicle appears at short intervals, the display device can reduce the stimulus that is given by the first blinking display to the driver, thus reducing the possibility that the first blinking display makes the driver feel bothersome.

In the above aspect, the electronic control unit may be configured to determine whether a preceding vehicle whose deceleration is equal to or larger than a deceleration threshold before the host vehicle presents ahead of the host vehicle, based on the recognition result of the other vehicles; calculate a second appearance interval when the preceding vehicle is determined to present, the second appearance interval being an interval that increases according to a time elapsed from a time when the preceding vehicle is last determined to present; cause the display unit to display a second blinking display on the windshield when the preceding vehicle is determined to present, the second blinking display being displayed to alert the driver to the preceding vehicle; and reduce a number of blinks of the second blinking display when the second appearance interval is smaller than a second threshold as compared with a case when the second appearance interval is equal to or larger than the second threshold.

According to the display device in the aspect described above, if it is determined that, before the host vehicle, there is a preceding vehicle whose deceleration is equal to or larger than the deceleration threshold, the display device projects the second blinking display on the windshield to alert the driver to the preceding vehicle, thus preventing the driving awareness of the driver from being reduced. Furthermore, if it is determined that there is a preceding vehicle that satisfies the condition described above, the display device projects the second blinking display on the windshield. Projecting the second blinking display on the windshield in this way reduces the possibility that the driver feels bothersome about the blinking display as compared with the case in which the blinking display is projected at a constant periodic interval regardless of the surrounding environment of the host vehicle. In addition, when the second appearance interval of the preceding vehicle is smaller than the second threshold, the display device reduces the number of blinks of the second blinking display as compared with the case when the second appearance interval is equal to or larger than the second threshold. Therefore, when the deceleration of the preceding vehicle occurs frequently, the display device can reduce the stimulus that is given by the second blinking display to the driver, thus reducing the possibility that the second blinking display makes the driver feel bothersome.

In the above aspect, the electronic control unit may be configured to acquire an image captured by a camera, the camera being mounted on the host vehicle and configured to capture the driver; determine whether the driver is in a driving awareness reduced state, based on the captured image; and reduce the number of blinks of the first blinking display when the squeezing candidate vehicle is determined to present and the driver is not determined to be in the driving awareness reduced state, as compared with a case when the driver is determined to be in the driving awareness reduced state.

According to the display device in the aspect described above, if it is determined that the driver is not in the driving awareness reduced state, the display device reduces the number of blinks of the first blinking display. By doing so, the display device avoids the first blinking display from giving an excessive stimulus to the driver who is well aware of driving the host vehicle, thereby reducing the possibility that the first blinking display makes the driver feel bothersome.

In the above aspect, the electronic control unit may be configured to acquire an image captured by a camera, the camera being mounted on the host vehicle and configured to capture the driver; determine whether the driver is in a driving awareness reduced state, based on the captured image; and reduce the number of blinks of the second blinking display when the preceding vehicle is determined to present and the driver is not determined to be in the driving awareness reduced state as compared with a case when the driver is determined to be in the driving awareness reduced state.

According to the display device in the aspect described above, if it is determined that the driver is not in the driving awareness reduced state, the display device reduces the number of blinks of the second blinking display. By doing so, the display device avoids the second blinking display from giving an excessive stimulus to the driver who is well aware of driving the host vehicle, thereby reducing the possibility that the second blinking display makes the driver feel bothersome.

In the above aspect, the electronic control unit may be configured to recognize a lateral position, the lateral position being a position of the host vehicle in a lane width direction of a first traveling lane in which the host vehicle travels; determine whether the host vehicle has approached one of left and right white lines of the traveling lane, based on the lateral position; and cause the display unit to display a third blinking display on the windshield when the host vehicle is determined to approach one of the left and right white lines, the third blinking display being displayed to alert the driver to the white line that the host vehicle has approached.

According to the display device in the aspect described above, if it is determined that the host vehicle wanders left and right and has approached one of the left and right white lines, the display device projects the third blinking display onto the windshield to prevent the driving awareness of the driver from being reduced while alerting the driver to the white line.

In the above aspect, the electronic control unit may be configured to determine whether an adjacent vehicle is the squeezing candidate vehicle based on a lane-width-direction distance between the adjacent vehicle and a first traveling lane in which the host vehicle travels, the adjacent vehicle being one of the other vehicles, and traveling in a second traveling lane adjacent to the first traveling lane.

In the above aspect, the electronic control unit may be configured to display the first blinking display at a position that is below an image of the squeezing candidate vehicle on the windshield and that is nearer to the first traveling lane than the squeezing candidate vehicle.

In the above aspect, the electronic control unit may be configured to predict a movement path of the squeezing candidate vehicle and to display the first blinking display on the predicted movement path.

In the above aspect, the electronic control unit may be configured to display the second blinking display below an image of the preceding vehicle on the windshield.

According to the aspect of present disclosure, it is possible to reduce the possibility that the driver feels bothersome about a display that is output to prevent the driving awareness of the driver from being reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a block diagram showing a display device in a first embodiment;

FIG. 10 is a flowchart showing the projection processing of the second blinking display;

DETAILED DESCRIPTION OF EMBODIMENTS

Figure 2A:
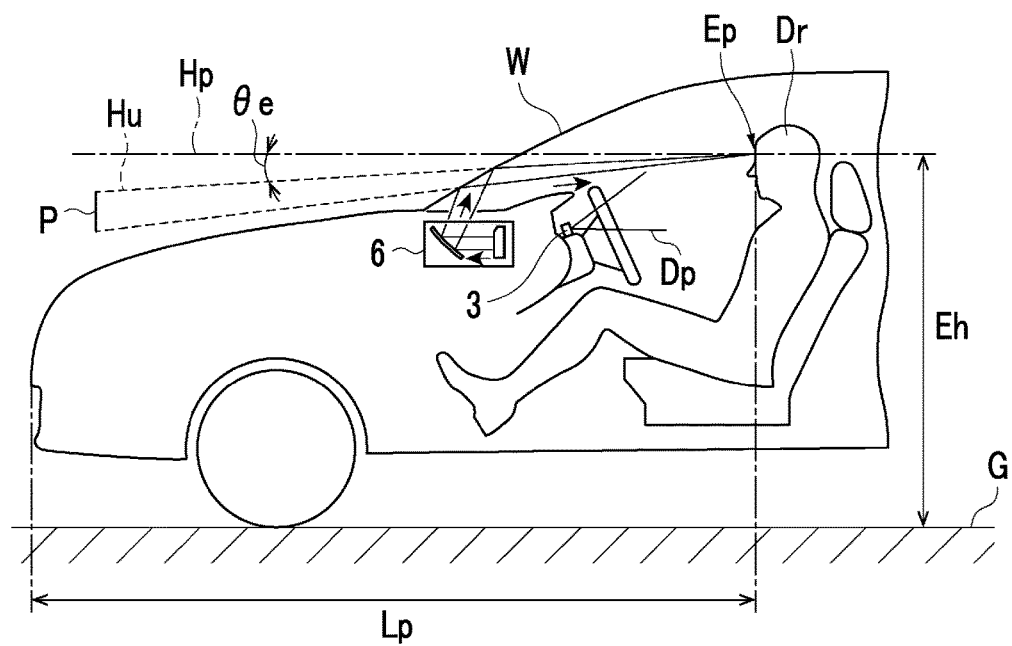
FIG. 2A is a diagram showing the projection of a blinking display on the windshield.

Embodiments are described in detail below with reference to the drawings. In the description below, the same reference numeral is used for the same component or a functionally equivalent component and the duplicated description is omitted.

First Embodiment

FIG. 1 is a block diagram showing a display device 100 in a first embodiment. The display device 100, mounted on a vehicle such as a passenger car (hereinafter referred to as a host vehicle), is a device for projecting various displays on the windshield of the host vehicle. Various displays include a blinking display for alerting the driver to other vehicles around the host vehicle.

The host vehicle in this embodiment is a vehicle capable of autonomous driving. Autonomous driving refers to vehicle control by which the host vehicle autonomously travels along a target route that is set in advance. During autonomous driving, the host vehicle travels autonomously with no need for the driver to perform the driving operation. The target route refers to a route on the map along which the host vehicle will travel during autonomous driving.

While the host vehicle travels in the autonomous driving mode, there is a possibility that the driving awareness of the driver (awareness about the driving of the host vehicle) is reduced. To avoid this, the display device 100 projects a blinking display on the windshield of the host vehicle to give a visual stimulus to the driver for preventing the driving awareness from being reduced. At the same time, to prevent a condition in which the driver feels bothersome with an excessive visual stimulus, the display device 100 changes the number of blinks of the blinking display according to the traveling environment of the host vehicle (situation of other vehicles around the host vehicle).

<Configuration of the Display Device in the First Embodiment>

The configuration of the display device 100 in the first embodiment is described below with reference to the drawings. As shown in FIG. 1, the display device 100 includes an electronic control unit (ECU) 10 that integrally controls the device.

The ECU 10 is an electronic control unit that includes a central processing unit [CPU], a read-only memory [ROM], a random access memory [RAM], and so on. The ECU 10 is connected to a stereo camera 1, a radar sensor 2, a driver monitor camera 3, a vehicle speed sensor 4, an autonomous driving ECU 5, and a display projection unit 6.

The stereo camera 1 is a capturing apparatus that captures the area ahead of and behind the host vehicle. The stereo camera 1 has two capturing cameras arranged so that the disparity between the right eye and the left eye can be reproduced. The two capturing cameras are provided, for example, on the interior side of the windshield, and the interior side of the rear windshield, of the host vehicle. The stereo camera 1 sends the captured information on the area ahead of and behind the host vehicle to the ECU 10. The captured information of the stereo camera 1 also includes the depth-direction information. A monocular camera may be used instead of the stereo camera 1. The stereo camera 1 may be provided to capture the left and right sides of the host vehicle.

The radar sensor 2, provided for example on the front end of the host vehicle, detects an obstacle ahead of the host vehicle (including obliquely forward area of the host vehicle) using radio waves (or light). The radar sensor 2 detects an obstacle by sending radio waves to the area ahead of the host vehicle and by receiving radio waves reflected by an obstacle such as other vehicles. The radar sensor 2 sends the obstacle information on the detected obstacle to the ECU 10. The radar sensor 2 may be provided so that an obstacle on the left and right sides of the host vehicle can be detected.

The driver monitor camera 3, provided on the cover of the steering column of the host vehicle and in front of the driver, captures the face of the driver (see FIG. 2A). FIG. 2A shows the capturing range Dp of the driver monitor camera 3. A plurality of driver monitor cameras 3 may be provided to capture the driver from a plurality of directions. The driver monitor camera 3 sends the captured information on the driver to the ECU 10.

The vehicle speed sensor 4 is a detector that detects the vehicle speed of the host vehicle. For example, as the vehicle speed sensor 4, a wheel speed sensor is used that is provided on the wheels of the host vehicle or on the drive shaft, which rotates in synchronization with the wheels, to detect the rotational speed of the wheels. The vehicle speed sensor 4 sends the detected vehicle speed information to the ECU 10.

The autonomous driving ECU 5 performs autonomous driving to cause the host vehicle to travel autonomously. The autonomous driving ECU 5 is an electronic control unit having a CPU, a ROM, a RAM, a CAN communication circuit, and so on. The autonomous driving ECU 5 is connected to a map database that stores map information, a positioning unit that measures the position of the host vehicle on the map using the global positioning system [GPS], various sensors that detect the traveling status of the host vehicle, and various actuators that cause the host vehicle to travel.

The map information stored in the map database includes the position information on roads (position information on each lane), the information on road shapes (for example, information on whether a road is a curved road or a straight road, the curvature of a curved road), the information on road widths (information on lane widths), the information on road slopes, the information on the cant angle of a road, and the information on the maximum vehicle speed on a road. The various sensors include a yaw rate sensor that detects the yaw rate of the host vehicle and an acceleration sensor that detects the acceleration of the host vehicle. The various actuators include a steering actuator that controls the steering angle of the host vehicle, a brake actuator that controls the brake system of the host vehicle, and an engine actuator that controls the engine of the host vehicle (or the motor of an electric vehicle).

The autonomous driving ECU 5 searches for a target route, from the current position of the host vehicle to the destination, based on the map information stored in the map database, the position information on the host vehicle on the map measured by the positioning unit, and the destination that is set in advance. The autonomous driving ECU 5 generates a travel plan according to which the host vehicle will travel along the target route. The travel plan includes, for example, a steering target value and a vehicle speed target value that are set for each predetermined distance on the target route. The autonomous driving ECU 5 generates a travel plan using a known method. The autonomous driving ECU 5 performs the autonomous driving of the host vehicle according to the travel plan based on the position information on the host vehicle on the map measured by the positioning unit. The autonomous driving ECU 5 performs autonomous driving by sending the control signal to the various actuators for controlling the host vehicle.

The display projection unit 6, mounted on the host vehicle, is a head-up display [HUD] that projects the display of various types of information onto the windshield. The display projection unit 6 can employ a configuration known as the configuration of a HUD. The display projection unit 6 may be an embedded-type HUD embedded in the dashboard of the host vehicle. The display projection section 6 projects the display of various types of information onto the windshield based the control signal from the ECU 10.

Figure 2B:
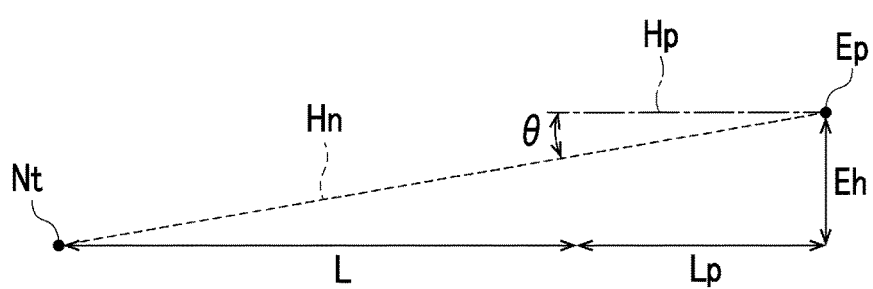
FIG. 2B is a diagram showing the depression angle when a driver views the lower end of a preceding vehicle from the driver eye point.

FIG. 2A is a diagram showing the projection of blinking displays on the windshield. FIG. 2A shows the driver monitor camera 3, display projection unit 6, driver Dr, ground line G corresponding to the ground, height Eh of the driver eye point Ep, straight line Hp extending in the longitudinal direction of the host vehicle through the driver eye point Ep, blinking display P, straight line Hu connecting the driver eye point Ep and the upper end of the blinking display P, angle θe formed by the straight line Hp and the straight line Hu, and distance Lp between the driver eye point Ep and the front end of the host vehicle. The driver eye point Ep is, for example, a virtual point (one point) that represents the position of the driver's eyes in the normal driving state. The driver eye point Ep is set, for example, at a pre-set position in the interior of the host vehicle. The position of the driver eye point Ep is determined, for example, when designing the host vehicle or shipping the host vehicle. FIG. 2B will be described later.

Figure 3:
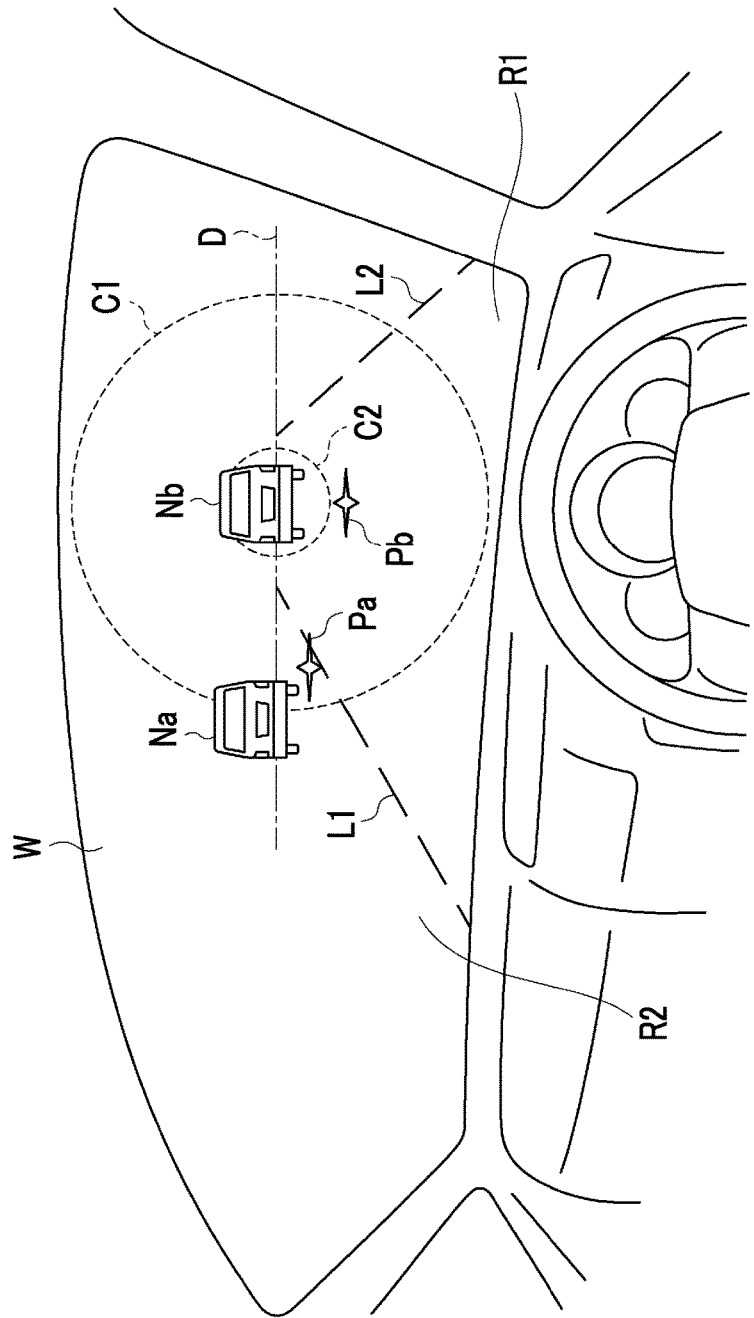
FIG. 3 is a diagram showing blinking displays projected on the windshield.

FIG. 3 is a diagram showing blinking displays projected on the windshield. FIG. 3 shows the windshield W of the host vehicle, the traveling lane R1 in which the host vehicle travels (host vehicle lane), the left side white line L1 of the traveling lane R1, the right side white line L2 of the traveling lane R1, the adjacent lane R2 adjacent to the left side of the traveling lane R1, another vehicle (corresponding to a squeezing candidate vehicle that will be described later) Na traveling in the adjacent lane R2, the preceding vehicle Nb of the host vehicle, the display outer frame C1 and the display inner frame C2, the reference horizontal line D, the first blinking display Pa (blinking display P) that alerts the driver to another vehicle Na, and the second blinking display Pb (blinking display P) that alerts the driver to the preceding vehicle Nb. The first blinking display Pa and the second blinking display Pb are virtual images projected on the windshield W. FIG. 3 will be described in detail later.

Next, the functional configuration of the ECU 10 is described. Note that a part of the functions of the ECU 10 may be executed by a computer in the facilities such as an information management center capable of communicating with the host vehicle or may be executed by a mobile information terminal capable of communicating with the host vehicle. The ECU 10 includes an other vehicle recognition unit 11, a white line recognition unit 12, a vehicle speed determination unit 13, a squeezing candidate vehicle determination unit 14, a preceding vehicle determination unit 15, an appearance interval calculation unit 16, a driver status determination unit 17, and a display control unit 18.

The other vehicle recognition unit 11 recognizes other vehicles around the host vehicle based on the information captured by the stereo camera 1 and/or the obstacle information obtained by the radar sensor 2. The other vehicle recognition unit 11 recognizes the relative position of the other vehicle with respect to the host vehicle and the moving direction and moving speed of the other vehicle with respect to the host vehicle.

The white line recognition unit 12 recognizes the left and right white lines L1 and L2, which form the traveling lane R1, based on the information captured by the stereo camera 1. The white line recognition unit 12 recognizes the white lines from captured images captured by the stereo camera 1 using a known image processing method. The white line recognition unit 12 may also recognize the white lines L1 and L2 from the reflection data, which is generated by the radar sensor 2 using light or radio waves, based on the obstacle information obtained by the radar sensor 2.

The vehicle speed determination unit 13 determines whether the vehicle speed of the host vehicle is equal to or higher than the vehicle speed threshold based on the vehicle speed information obtained by the vehicle speed sensor 4. The vehicle speed threshold is a threshold (for example, 30 km/h) that is set in advance. The vehicle speed determination unit 13 determines the vehicle speed of the host vehicle, because there is a possibility that an excessive stimulus, if given to the driver when the host vehicle is traveling at a low speed or is stopped, makes the driver feel bothersome.

The squeezing candidate vehicle determination unit 14 determines whether there is a squeezing candidate vehicle that will squeeze before the host vehicle if the vehicle speed determination unit 13 determines that the vehicle speed of the host vehicle is equal to or higher than the vehicle speed threshold. The squeezing candidate vehicle determination unit 14 determines whether there is a squeezing candidate vehicle based on the recognition result of the other vehicle recognition unit 11. Squeezing means that another vehicle gets into the space between the host vehicle and the preceding vehicle. Squeezing also includes the case in which another vehicle gets into the space before the host vehicle when there is no preceding vehicle (for example, within 10 m from the host vehicle).

Figure 4:
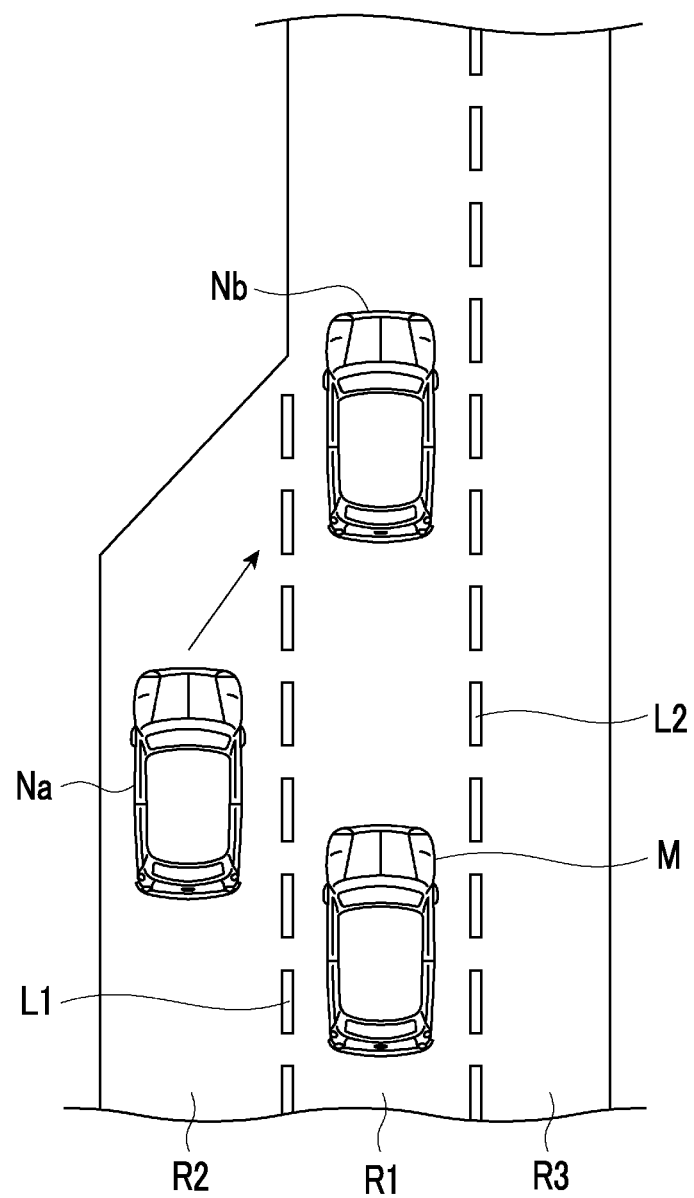
FIG. 4 is a top view showing a squeezing candidate vehicle and a preceding vehicle.

FIG. 4 is a top view showing a squeezing candidate vehicle and a preceding vehicle. FIG. 4 shows the host vehicle M, the left-side adjacent lane R2 and the right-side adjacent lane R3 adjacent to the traveling lane R1, the squeezing candidate vehicle Na, and the preceding vehicle Nb. As shown in FIG. 4, one example of the squeezing candidate vehicle Na is another vehicle that is traveling in the adjacent lane R2 (or the adjacent lane R3) adjacent to the traveling lane R1, in which the host vehicle M is traveling, and that satisfies the determination condition that is set in advance. The determination condition can be determined by the lateral distance between the other vehicle and the traveling lane R1 of the host vehicle M (the distance of the traveling lane R1 in the width direction), the relative speed between the other vehicle and the host vehicle M, whether or not the blinker of the other vehicle is turned on, and the inter-vehicle distance between the host vehicle M and the preceding vehicle Nb. The adjacent lane R2, though a merging lane that merges into the traveling lane R1 in FIG. 4, is not necessarily be a merging lane.

If the lateral distance between the other vehicle and the traveling lane R1 of the host vehicle M is equal to or smaller than the lateral distance threshold and if the relative speed between the other vehicle and the host vehicle M is equal to or lower than the relative speed threshold, the squeezing candidate vehicle determination unit 14 determines that there is a squeezing candidate vehicle Na. The lateral distance between the other vehicle and the traveling lane R 1 of the host vehicle M is the distance in the lane width direction of the traveling lane R1 in the planar view and is the distance between the end of the other vehicle on the traveling lane R1 side (end of one of the left and right ends on the traveling lane R1 side) and the white line L1 of the traveling lane R1 (white line on the other-vehicle side). The relative speed between the other vehicle and the host vehicle M is the absolute value of the relative speed between the other vehicle and the host vehicle M in the traveling direction of the host vehicle M. The lateral distance threshold is a value that is set in advance (for example, 1 m). The relative speed threshold is also a value (for example, 3 km/h) that is set in advance. The squeezing candidate vehicle determination unit 14 determines whether the relative speed between the host vehicle M and the squeezing candidate vehicle Na is equal to or lower than the relative speed threshold. This is because, before the squeezing candidate vehicle Na actually squeezes before the host vehicle M, the squeezing candidate vehicle Na usually matches the speed with the speed of the host vehicle M (the relative speed becomes close to zero) in order to check the behavior of the host vehicle M. To determine whether the other vehicle is a squeezing candidate vehicle Na, the squeezing candidate vehicle determination unit 14 may take into consideration only the other vehicle in the adjacent lane that is traveling in parallel to, or ahead of, the host vehicle M. The squeezing candidate vehicle determination unit 14 does not necessarily need to determine the relative speed between the other vehicle and the host vehicle M. Instead, the squeezing candidate vehicle determination unit 14 may determine whether there is a squeezing candidate vehicle Na from the determination result of the lateral distance between the other vehicle and the traveling lane R1.

If the blinker on the traveling lane R1 side of the other vehicle is turned on, the squeezing candidate vehicle determination unit 14 determines that there is a squeezing candidate vehicle Na. Based on the information captured by the stereo camera 1, the squeezing candidate vehicle determination unit 14 uses a known image processing technique to determine whether the blinker on the traveling lane R1 side of the other vehicle is turned on.

When the inter-vehicle distance between the host vehicle M and the preceding vehicle Nb is equal to or smaller than inter-vehicle distance threshold, the squeezing candidate vehicle determination unit 14 determines that there is no squeezing candidate vehicle Na. The inter-vehicle distance threshold is a value that is set in advance (for example, 1 m). When the inter-vehicle distance between host vehicle M and the preceding vehicle Nb is short, the squeezing candidate vehicle determination unit 14 determines that there is no squeezing candidate vehicle Na because there is no room for the other vehicle to squeeze between the two vehicles.

If the vehicle speed determination unit 13 determines that the vehicle speed of the host vehicle M is equal to or higher than the vehicle speed threshold, the preceding vehicle determination unit 15 determines whether there is a preceding vehicle Nb, whose deceleration is equal to or larger than the deceleration threshold, before the host vehicle M. The preceding vehicle Nb is a vehicle traveling immediately ahead of the host vehicle in the same traveling lane in which the host vehicle M is traveling (see FIG. 4). As shown in FIG. 4, the preceding vehicle determination unit 15 determines whether there is a preceding vehicle Nb whose deceleration is equal to or larger than the deceleration threshold based on the recognition result of the other vehicle recognition unit 11 (for example, the change in the speed of the preceding vehicle Nb detected by the radar sensor 2). The deceleration threshold is a value that is set in advance. The deceleration threshold may be a value that changes according to the inter-vehicle distance between the host vehicle M and the preceding vehicle Nb. The deceleration threshold may be a value that is smaller as the inter-vehicle distance (or time to collision) between the host vehicle M and the preceding vehicle Nb is shorter.

If the squeezing candidate vehicle determination unit 14 determines that there is a squeezing candidate vehicle Na, the appearance interval calculation unit 16 calculates the first appearance interval Ti corresponding to the time elapsed from the time it was last determined that there was a squeezing candidate vehicle Na. The first appearance interval Ti mentioned here is the time equal to the time elapsed from the time it was last determined that there was a squeezing candidate vehicle Na. Another example of the first appearance interval Ti will be described later.

If it is determined that there is a squeezing candidate vehicle Na, the appearance interval calculation unit 16 stores the determination time. If the current determination is the first determination after the engine of the host vehicle M was started, the appearance interval calculation unit 16 does not calculate the first appearance interval Ti.

Similarly, if the preceding vehicle determination unit 15 determines that there is a preceding vehicle Nb whose deceleration is equal to or larger than the deceleration threshold, the appearance interval calculation unit 16 calculates the second appearance interval Tj corresponding to the time elapsed from the time it was last determined that there was a preceding vehicle Nb whose deceleration was equal to or larger than the deceleration threshold. The second appearance interval Tj mentioned here is the time equal to the time elapsed from the time it was last determined that there was a preceding vehicle Nb. Another example of the second appearance interval Tj will be described later.

If it is determined that there is a preceding vehicle Nb whose deceleration is equal to or larger than the deceleration threshold, the appearance interval calculation unit 16 stores the determination time. If the current determination is the first determination after the engine of the host vehicle M was started, the appearance interval calculation unit 16 does not calculate the second appearance interval Tj.

The driver status determination unit 17 determines whether the driver is in the driving awareness reduced state based on the image captured by the driver monitor camera 3. The driving awareness reduced state refers to the state in which the awareness of the driver regarding the operation of the host vehicle M is reduced. The driving awareness reduced state includes the looking-aside state in which the driver looks aside while driving, the inattentive state in which the driver is watching a mobile terminal and so on while driving, and the wakefulness reduced state in which driver feels drowsy.

Based on the image captured by the driver monitor camera 3, the driver status determination unit 17 uses a known image processing method to recognize whether the driver is looking sideways. If the looking-sideway duration, which is the duration during which the driver is looking sideways, is equal to or larger than the looking-sideway duration threshold Ty, the driver status determination unit 17 determines that the driver is in the looking-aside driving state (driving awareness reduced state). The looking-sideway duration threshold Ty is a value that is set in advance.

Based on the image captured by the driver monitor camera 3, the driver status determination unit 17 uses a known image processing method to recognize whether the driver's eyes are closed (the state in which the eyelids are closed). If the eye closure duration, which is the duration time during which the driver's eyes are closed, is equal to or larger than the eye closure duration threshold Tg, the driver status determination unit 17 determines that the driver is in the wakefulness reduced state (driving awareness reduced state). The eye closure duration threshold Tg is a value that is set in advance.

The display control unit 18 controls the display projection unit 6. The display control unit 18 sends the control signal to the display projection unit 6 to project the display of various types of information onto the windshield W.

First, the projection of the first blinking display Pa by the display control unit 18 is described. If the squeezing candidate vehicle determination unit 14 determines that there is a squeezing candidate vehicle Na, the display control unit 18 projects the first blinking display Pa on the windshield W (see FIG. 3). The first blinking display Pa is a blinking display for alerting the driver to the presence of a squeezing candidate vehicle Na. If it is determined that there is a squeezing candidate vehicle Na but if the number of blinks is determined to be zero, the display control unit 18 does not project the first blinking display Pa as will be described later.

If it is determined that there is a squeezing candidate vehicle Na, the display control unit 18 recognizes the image of the squeezing candidate vehicle Na on the windshield W, as seen by the driver from the driver eye point Ep, based on the recognition result of the other vehicle recognition unit 11. For example, the display control unit 18 uses a known image processing method (viewpoint conversion processing or the like) to recognize the image of the squeezing candidate vehicle Na based on the image captured by the stereo camera 1.

The display control unit 18 projects the first blinking display Pa in the circular display outer frame C1 shown in FIG. 3 so that the line of sight of the driver is directed to the image of the squeezing candidate vehicle Na. The display outer frame C1 is a frame having a size large enough to include the effective visual field of the driver when the driver looks the area ahead of the host vehicle M from the driver eye point Ep. The effective visual field is the range in which the driver can visually recognize an object, such as a preceding vehicle, instantaneously only by the eye movement. The effective visual field is, for example, a range of an elevation angle of 8°, a depression angle of 12°, and a left and right depression angle of 15°. The display outer frame C1 may be an elliptical frame.

The reference horizontal line D shown in FIG. 3 is a virtual horizontal line extending right and left from the image of the preceding vehicle Nb. The display control unit 18 displays the first blinking display Pa in the area below the reference horizontal line D within the display outer frame C1. Note that the display outer frame C1 and the reference horizontal line D are not projected on the windshield W and that the display outer frame C1 and the reference horizontal line D are not necessarily be set.

The display control unit 18 projects the first blinking display Pa obliquely below the image of the squeezing candidate vehicle Na (below the image and nearer to the traveling lane R1) on the windshield W in the display outer frame C1. For example, the display control unit 18 displays the first blinking display Pa at a position that is in the adjacent lane R2 in which the squeezing candidate vehicle Na is traveling and that is slightly shifted from the white line L1 on the adjacent lane R2 side. For example, the display control unit 18 projects the first blinking display Pa at a position on the windshield W with a depression angle of 3° and a left and right depression angle of 4°. The display control unit 18 displays the first blinking display Pa in such a way that the first blinking display Pa does not overlap with the image of the squeezing candidate vehicle Na.

Next, the appropriate time at which the display control unit 18 projects the first blinking display Pa is described below. First, it is thought that the visual stimulus, given by the first blinking display Pa, is effective for the driver for the duration about 0.5 seconds. Therefore, it is preferable to avoid projecting the blinking display Pa 0.5 seconds or more earlier than the time at which the squeezing candidate vehicle Na appears in the effective visual field of the driver (see Reference 1 below). On the other hand, when the processing speed, from the time the image of the squeezing candidate vehicle Na is recognized to the time the first blinking display Pa is projected, is not fast enough, the squeezing candidate vehicle Na moves during that time. As a result, there is a possibility that the display control unit 18 cannot project the first blinking display Pa at an appropriate position such as the position indicated in FIG. 3.

Figure 5:
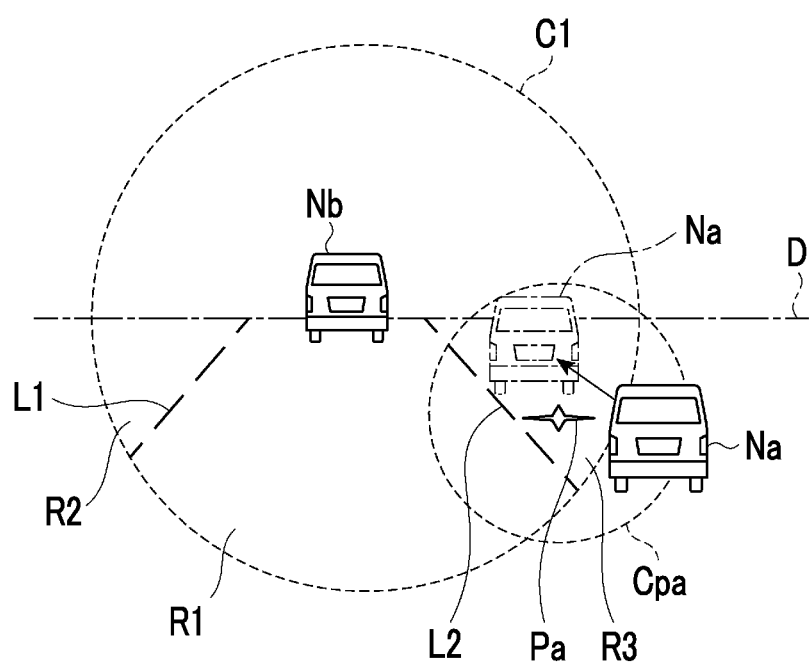
FIG. 5 is a diagram showing the projection of a first blinking display.

FIG. 5 is a diagram showing the projection of the first blinking display. In FIG. 5, the squeezing candidate vehicle Na is traveling in the left adjacent lane R 3 of the host vehicle M. In FIG. 5, the squeezing candidate vehicle Na that will be predicted in future is indicated by the broken line. The attention attraction range Cpa is the range to which the attention (line of sight) of the driver, who has been looking ahead while paying attention to the first blinking display Pa, is attracted. The attention attraction range Cpa is the circular range of a fixed size on the windshield W with the center at the first blinking display Pa.

As shown in FIG. 5, the display control unit 18 may project the first blinking display Pa on the image movement path (path) of the squeezing candidate vehicle Na on the windshield W that is seen by the driver from the driver eye point Ep. The display control unit 18 projects the first blinking display Pa on the movement path of the squeezing candidate vehicle Na, assuming that the image of the squeezing candidate vehicle Na on the windshield W will move to the position that gets nearer to the traveling lane R1 (the position indicated by the broken line in FIG. 5). Projecting the first blinking display Pa on the movement path of the image of the squeezing candidate vehicle Na in this manner allows the display control unit 18 to easily project the first blinking display Pa in such a way that the future image of the squeezing candidate vehicle Na is included in the attention guiding range Cpa, thus enhancing the robustness (display stability). The display control unit 18 may also project the first blinking display Pa below the moving path.

Figure 6A:
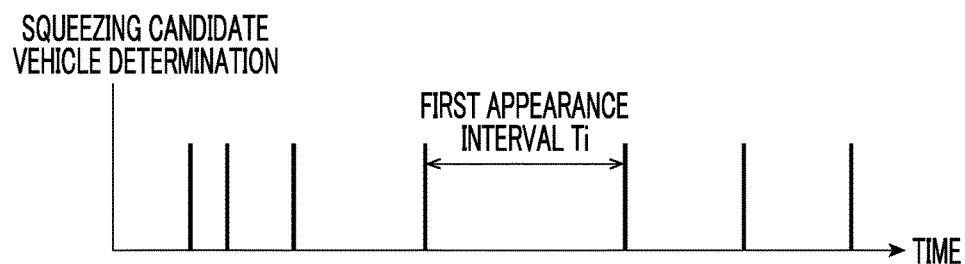
FIG. 6A is a diagram showing the determination result of a squeezing candidate vehicle on the time axis.
Figure 6B:
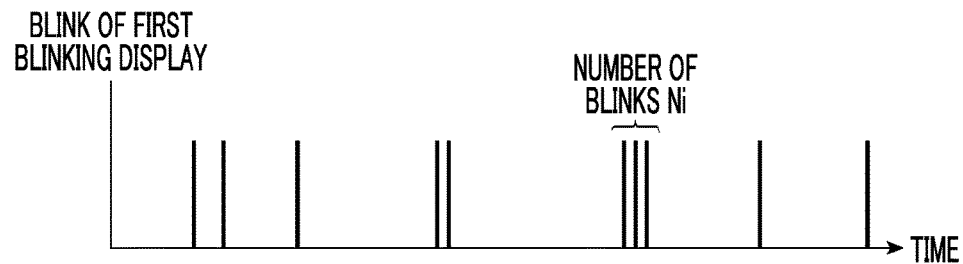
FIG. 6B is a diagram showing a change in the number of blinks of the first blinking display on the time axis.

The display control unit 18 sets the number of blinks Ni of the first blinking display Pa based on the first appearance interval Ti calculated by the appearance interval calculation unit 16. FIG. 6A is a diagram showing the determination result of the squeezing candidate vehicles on the time axis. In FIG. 6A, the determination time of a squeezing candidate vehicle Na is indicated as a bar line that rises from the time axis. The interval between any two bar lines on the time axis in FIG. 6A corresponds to the first appearance interval Ti. FIG. 6B is a diagram showing a change in the number of blinks of the first blinking display on the time axis. In FIG. 6B, one blink of the first blinking display Pa is indicated as a bar line that rises from the time axis. One blink means that the display is turned on once and turned off once. If the turn-on duration of one blink is too long, the line of sight of the driver tends to remain directed to the visual stimulus with the result that the driver is delayed in directing attention to the squeezing candidate vehicle Na that is near to the first blinking display Pa. Therefore, it is important to make the turn-on duration shorter (for example 50 msec.).

The time axis in FIG. 6A corresponds to the time axis in FIG. 6B. As shown in FIGS. 6A and 6B, the display control unit 18 increases the number of blinks Ni of the first blinking display Pa as the first appearance interval Ti becomes longer.

Figure 7A:
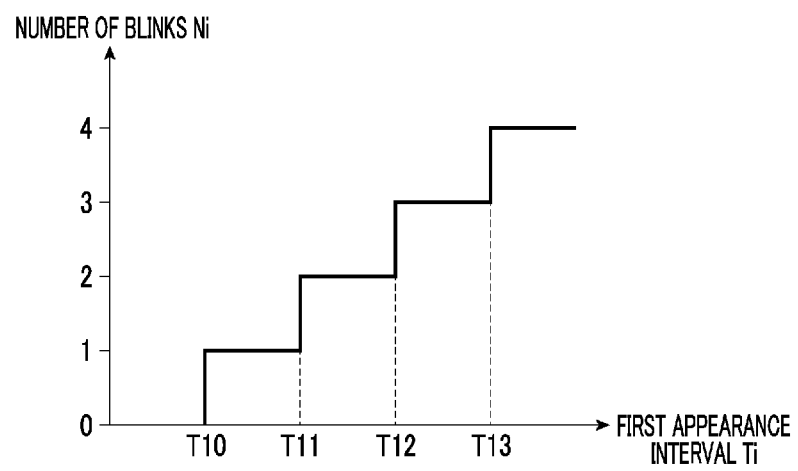
FIG. 7A is a diagram showing the relation between the first appearance interval and the number of blinks of the first blinking display.

FIG. 7A is a diagram showing the relation between the first appearance interval Ti and the number of blinks Ni of the first blinking display Pa. In FIG. 7A, the vertical axis represents the number of blinks Ni, and the horizontal axis represents the first appearance interval Ti. FIG. 7A shows thresholds T10, T11, T12, and T13. The thresholds T10 to T13 are the values that are set in advance. The threshold T10 is the threshold indicating the boundary between the case when the number of blinks Ni is zero and the case when the number of blinks Ni is 1. The threshold T11 is the threshold indicating the boundary between the case when the number of blinks Ni is 1 and the case when the number of blinks Ni is 2. The threshold T12 is the threshold indicating the boundary between the case when the number of blinks Ni is 2 and the case when the number of blinks Ni is 3. The threshold T13 is the threshold indicating the boundary between the case when the number of blinks Ni is 3 and the case when the number of blinks Ni is 4. The relation among the thresholds T10 to T13 is T10<T11<T12<T13. The thresholds T10 to T13 correspond to the first threshold in claims.

As shown in FIG. 7A, if the first appearance interval Ti is smaller than the threshold T10, the display control unit 18 sets the number of blinks Ni to zero. When the first appearance interval Ti is too short, repeating the projection of the first blinking display Pa may make the driver feel bothersome. Therefore, if the first appearance interval Ti is smaller than the threshold T10, the display control unit 18 sets the number of blinks Ni to zero to prevent the first blinking display Pa from being projected. In this embodiment, when the number of blinks Ni is zero, the first blinking display Pa is not projected.

The display control unit 18 sets the number of blinks to 1 when the first appearance interval Ti is equal to or larger than the threshold T10 but is smaller than the threshold T11. The display control unit 18 sets the number of blinks to 2 when the first appearance interval Ti is equal to or larger than the threshold T11 but is smaller than the threshold T12. The display control unit 18 sets the number of blinks to 3 when the first appearance interval Ti is equal to or larger than the threshold T12 but is smaller than the threshold T13. The display control unit 18 sets the number of blinks to 4 when the first appearance interval Ti is equal to or larger than the threshold T13.

That is, when the first appearance interval Ti is smaller than the threshold T10, the display control unit 18 reduces the number of blinks Ni of the first blinking display Pa as compared with the case when the first appearance interval Ti is equal to or larger than the threshold T10. The same is true for the thresholds T11 to T13.

When the driver status determination unit 17 determines that the driver is not in the driving awareness reduced state, the display control unit 18 reduces the number of blinks Ni of the first blinking display Pa as compared with the case when it is determined that the driver is in the driving awareness reduced state.

Figure 8A:
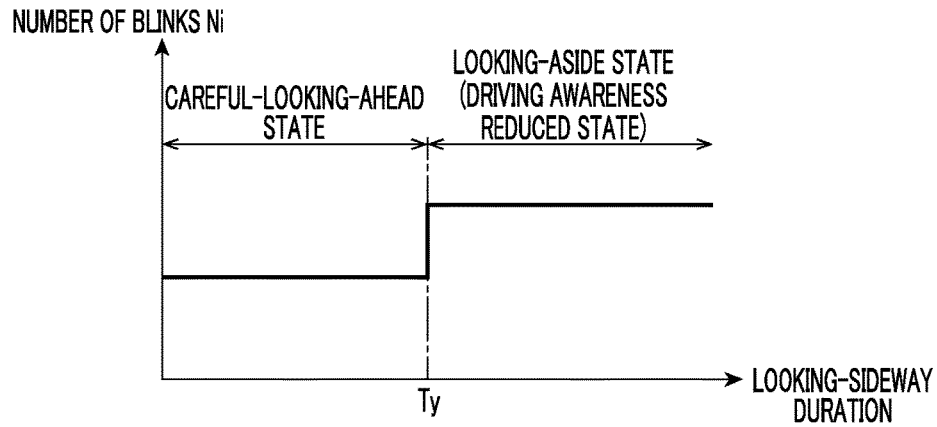
FIG. 8A is a diagram showing the relation between the looking-sideway duration of the driver and the number of blinks.

FIG. 8A is a diagram showing the relation between the looking-sideway duration of the driver and the number of blinks. FIG. 8A shows the looking-sideway duration threshold Ty. As shown in FIG. 8A, when it is determined that the looking-sideway duration of the driver is smaller than the looking-sideway duration threshold Ty and that driver is in the careful-looking-ahead state in which the driver is still looking ahead carefully (if it is determined that the driver is not in the looking-aside driving state), the display control unit 18 reduces the number of blinks Ni of the first blinking display Pa as compared with the case when it is determined that the driver is in the looking-aside driving state (driving awareness reduced state). That is, when it is determined that the driver is in the looking-aside driving state, the display control unit 18 increases the number of blinks Ni of the first blinking display Pa as compared with the case when it is not determined that the driver is in the looking-aside driving state.

Figure 8B:
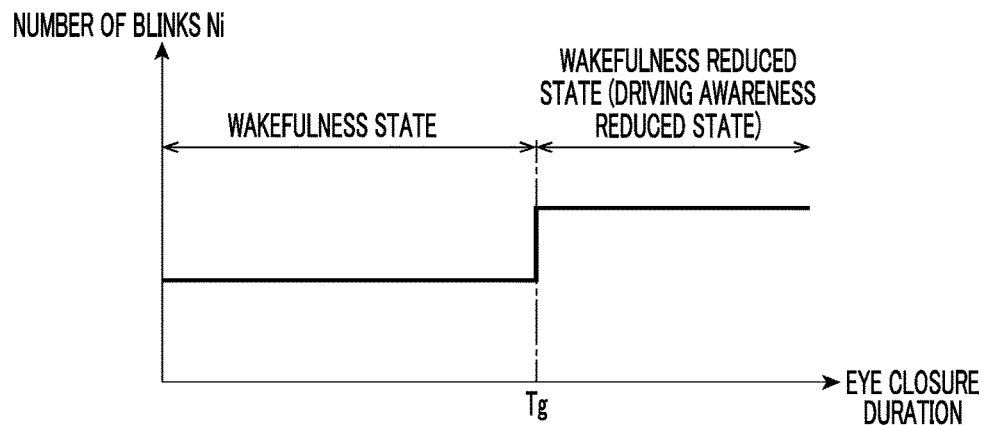
FIG. 8B is a diagram showing the relation between the eye closure duration of the driver and the number of blinks.
Figure 8C:
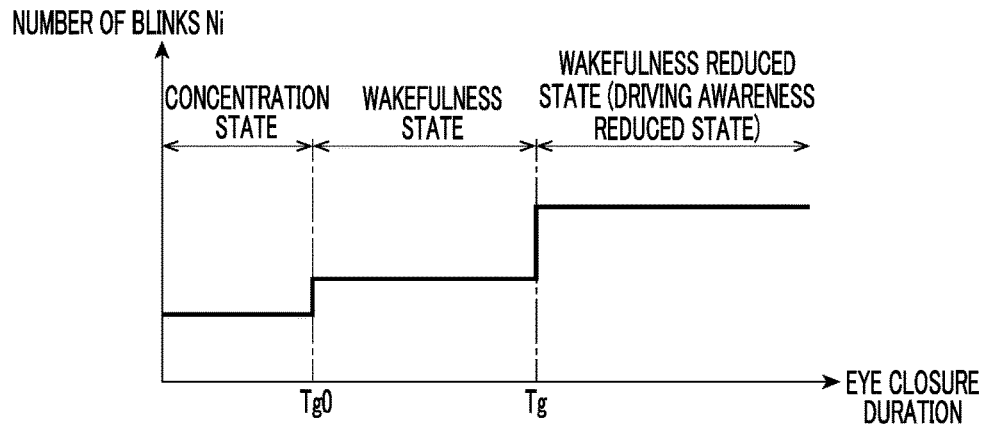
FIG. 8C is a diagram showing another example of the relation between the eye closure duration of the driver and the number of blinks.

FIG. 8B is a diagram showing the relation between the eye closure duration of the driver and the number of blinks. FIG. 8B shows the eye closure duration threshold Tg. As shown in FIG. 8B, when the eye closure duration of the driver is smaller than the eye closure duration threshold Tg and that the driver is still in the wakefulness state (if it is not determined that the driver is in the wakefulness reduced state), the display control unit 18 reduces the number of blinks Ni of the first blinking display Pa as compared with the case when it is determined that the driver is in the wakefulness reduced state (driving awareness reduced state). That is, when it is determined that the driver is in the wakefulness reduced state, the display control unit 18 increases the number of blinks Ni of the first blinking display Pa as compared with the case when it is not determined that the driver is in the wakefulness reduced state. FIG. 8C will be described later.

When the number of blinks Ni of the first blinking display Pa is set, the display control unit 18 projects the first blinking display Pa on the windshield W until the number of blinks reaches the number of blinks Ni. The blinking interval (blinking cycle) may be constant or may be shorter as the number of blinks Ni is larger.

Next, the projection of the second blinking display Pb by the display control unit 18 is described. If the preceding vehicle determination unit 15 determines that there is a preceding vehicle Nb, whose deceleration is equal to or larger than the deceleration threshold, ahead of the host vehicle M, the display control unit 18 projects the second blinking display Pb on the windshield W (see FIG. 3). The second blinking display Pb refers to a blinking display that alerts the driver to the presence of the preceding vehicle Nb. If it is determined that there is a preceding vehicle Nb whose deceleration is equal to or larger than the deceleration threshold but if the number of blinks is determined to be zero as will be described later, the display control unit 18 does not project the second blinking display Pb.

If it is determined that there is a preceding vehicle Nb whose deceleration is equal to or larger than the deceleration threshold, the display control unit 18 recognizes the image of the preceding vehicle Nb on the windshield W, as seen by the driver from the driver eye point Ep, based on the recognition result of the other vehicle recognition unit 11. The display control unit 18 recognizes the image of the preceding vehicle Nb, for example, based on the image captured by the stereo camera 1 using a known image processing method (viewpoint conversion processing and the like).

The display control unit 18 projects the second blinking display Pb in the circular display outer frame C1, shown in FIG. 3, so that the line of sight of the driver is directed to the preceding vehicle Nb. The display control unit 18 projects the second blinking display Pb at the position below the image of the preceding vehicle Nb. The display inner frame C2, shown in FIG. 3, is a circular frame that is set to prevent the second blinking display Pb from being overlapped with the image of the preceding vehicle Nb. The display inner frame C2 is set in such a way that the frame surrounds the lower part of the image of the preceding vehicle Nb. The display control unit 18 displays the display inner frame C2 in such a way that the inner frame C2 becomes larger as the inter-vehicle distance between the host vehicle M and the preceding vehicle Nb is shorter. The display control unit 18 projects the second blinking display Pb at a position that is in the area below the reference horizontal line D within the display outer frame C1 and is outside the display inner frame C2. Note that the display inner frame C2 is not projected on the windshield W and that the display inner frame C2 need not necessarily be set.

The display control unit 18 may project the second blinking display Pb using the method described below. In the description below, consider the state in which the host vehicle M is seen from the side as shown in FIG. 2A. The height Eh of the driver eye point Ep and the distance Lp from the driver eye point Ep to the front end of the host vehicle M, both of which are shown in FIG. 2A, are unique values determined by the type of a vehicle. The difference in the appearance (difference in scale) of the image of the preceding vehicle Nb between the appearance that is seen from the driver eye point Ep and the appearance that is seen from the windshield W is determined by the unique value described above. The scale of the image of the preceding vehicle Nb varies according to the distance from the host vehicle M to the preceding vehicle Nb and the unique value described above FIG. 2B is a diagram showing the depression angle θ that is formed when the lower end Nt of the preceding vehicle Nb is viewed from the driver eye point Ep. FIG. 2B shows the lower end of the preceding vehicle Nb (lower end of the rear wheels) Nt, the distance L from the front end of the host vehicle M to the lower end of the preceding vehicle Nb in the longitudinal direction of the host vehicle M, the straight line Hn that connects the driver eye point Ep and the lower end Nt of the preceding vehicle Nb, and the angle θ between the straight line Hn and the straight line Hp. The straight line Hp is a straight line that passes through the driver eye point Ep and extends in the longitudinal direction of the host vehicle M. The lower end Nt of the preceding vehicle Nb is the lower end of the preceding vehicle Nb in the three-dimensional space. The lower end Nt of the preceding vehicle Nb can be identified by a known image processing, for example, based on the image captured by the stereo camera 1. In addition, the distance L from the front end of the host vehicle M to the lower end Nt of the preceding vehicle Nb in the longitudinal direction of the host vehicle M can be detected, for example, based on the image captured by the stereo camera 1 (captured image including the depth information) or the obstacle information obtained by the radar sensor 2. More simply, the inter-vehicle distance between the host vehicle M and the preceding vehicle Nb may be used as the distance L. The angle θ between the straight line Hn and the straight line Hp corresponds to the depression angle when the driver sees the lower end Nt of the preceding vehicle Nb from the driver eye point Ep. The depression angle θ can be obtained, for example, by the following equation (1).

$$\theta = \text{Tan}-1\{Eh/(L+Lp)\} \quad (1)$$

On the other hand, as shown in FIG. 2A, the angle (depression angle) between the straight line Hu, which connects the driver eye point Ep and the upper end of the second blinking display Pb, and the straight line Hp is defined as θe. In this case, the display control unit 18 projects the second blinking display Pb on the windshield W so that the depression angle θ<depression angle θe. That is, the display control unit 18 projects the second blinking display Pb so that the depression angle θe, which is the depression angle when the driver sees the upper end of the second blinking display Pb, becomes larger than the depression angle θ that is the depression angle when the driver sees the lower end Nt of the preceding vehicle Nb from the driver eye point Ep (downward angle with respect to the straight line Hp). The display control unit 18 determines the position of the upper end of the second blinking display Pb (position in the vertical direction) so that the depression angle θ<depression angle θe is satisfied, for example, based on the depression angle θ calculated from the above equation (1). In addition, the display control unit 18 determines the position of the second blinking display Pb in the horizontal direction based on the image of the preceding vehicle Nb. In this case, the display control unit 18 can project the second blinking display Pb at a position below the image of the preceding vehicle Nb, based on position of the upper end of the second blinking display Pb and the position in the horizontal direction that have been determined.

The display control unit 18 determines the number of blinks Nj of the second blinking display Pb based on the second appearance interval Tj. The display control unit 18 determines the number of blinks Nj of the second blinking display Pb in the same way as for the squeezing candidate vehicle Na.

Figure 7B:
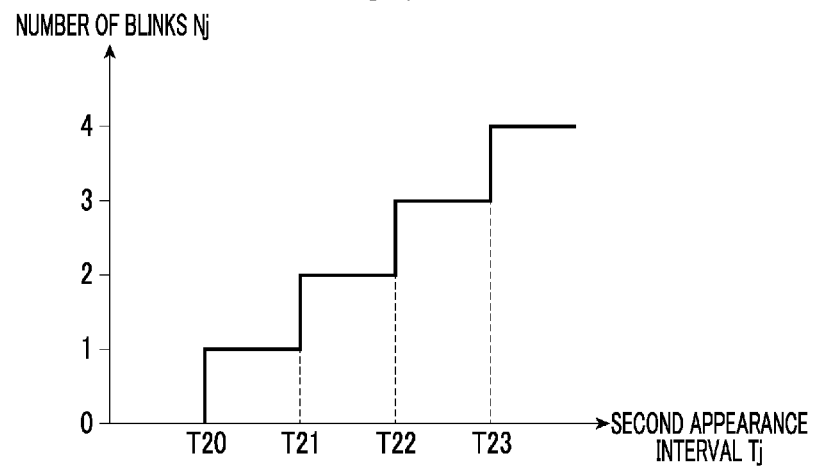
FIG. 7B is a diagram showing the relation between the second appearance interval and the number of blinks of the second blinking display.

FIG. 7B is a diagram showing the relation between the second appearance interval Tj and the number of blinks Nj of the second blinking display Pb. In FIG. 7B, the vertical axis represents the number of blinks Nj, and the horizontal axis represents the second appearance interval Tj. FIG. 7B shows thresholds T20, T21, T22, and T23. The thresholds T20 to T23 are the values that are set in advance. The threshold T20 is the threshold indicating the boundary between the case when the number of blinks Nj is zero and the case when the number of blinks Nj is 1. The threshold T21 is the threshold indicating the boundary between the case when the number of blinks Nj is 1 and the case when the number of blinks Nj is 2. The threshold T22 is the threshold indicating the boundary between the case when the number of blinks Nj is 2 and the case when the number of blinks Nj is 3. The threshold T23 is the threshold indicating the boundary between the case when the number of blinks Nj is 3 and the case when the number of blinks Nj is 4. The relation among the thresholds T20 to T23 is T20<T21<T22<T23. The thresholds T20 to T23 correspond to the second threshold in claims. The values of the thresholds T20 to T23 may be the same as, or different from, those of the thresholds T10 to T13.

As shown in FIG. 7B, if the second appearance interval Tj is smaller than the threshold T20, the display control unit 18 sets the number of blinks Nj to zero. When the second appearance interval Tj is too short, repeating the projection of the second blinking display Pb may make the driver feel bothersome. Therefore, if the second appearance interval Tj is smaller than the threshold T20, the display control unit 18 sets the number of blinks Nj to zero to prevent the second blinking display Pb from being projected.

The display control unit 18 sets the number of blinks to 1 when the second appearance interval Tj is equal to or larger than the threshold T20 but is smaller than the threshold T21. The display control unit 18 sets the number of blinks to 2 when the second appearance interval Tj is equal to or larger than the threshold T21 but is smaller than the threshold T22. The display control unit 18 sets the number of blinks to 3 when the second appearance interval Tj is equal to or larger than the threshold T22 but is smaller than the threshold T23. The display control unit 18 sets the number of blinks to 4 when the second appearance interval Tj is equal to or larger than the threshold T23.

That is, when the second appearance interval Tj is smaller than the threshold T20, the display control unit 18 reduces the number of blinks Nj of the second blinking display Pb as compared with the case when the second appearance interval Tj is equal to or larger than the threshold T20. The same is true for the thresholds T21 to T23.

When the driver status determination unit 17 determines that the driver is not in the driving awareness reduced state, the display control unit 18 reduces the number of blinks Nj of the second blinking display Pb as compared with the case when it is determined that the driver is in the driving awareness reduced state, in the same way as for the first blinking display Pa.

When it is determined that the looking-sideway duration of the driver is smaller than the looking-sideway duration threshold Ty and that driver is in the careful-looking-ahead state in which the driver is still looking ahead carefully, the display control unit 18 reduces the number of blinks Nj of the second blinking display Pb as compared with the case when it is determined that the driver is in the looking-aside driving state (driving awareness reduced state). That is, when it is determined that the driver is in the looking-aside driving state, the display control unit 18 increases the number of blinks Nj of the second blinking display Pb as compared with the case when it is not determined that the driver is in the looking-aside driving state.

In addition, when the eye closure duration of the driver is smaller than the eye closure duration threshold Tg and that the driver is still in the wakefulness state, the display control unit 18 reduces the number of blinks Nj of the second blinking display Pb as compared with the case when it is determined that the driver is in the wakefulness reduced state (driving awareness reduced state). That is, when it is determined that the driver is in the wakefulness reduced state, the display control unit 18 increases the number of blinks Nj of the second blinking display Pb as compared with the case when it is not determined that the driver is in the wakefulness reduced state.

When the number of blinks Nj of the second blinking display Pb is set, the display control unit 18 projects the second blinking display Pb on the windshield W until the number of blinks reaches the number of blinks Nj. The blinking interval (blinking cycle) may be constant or may be shorter as the number of blinks Nj is larger.

<Projection Processing of the First Blinking Display by the Display Device>

Figure 9:
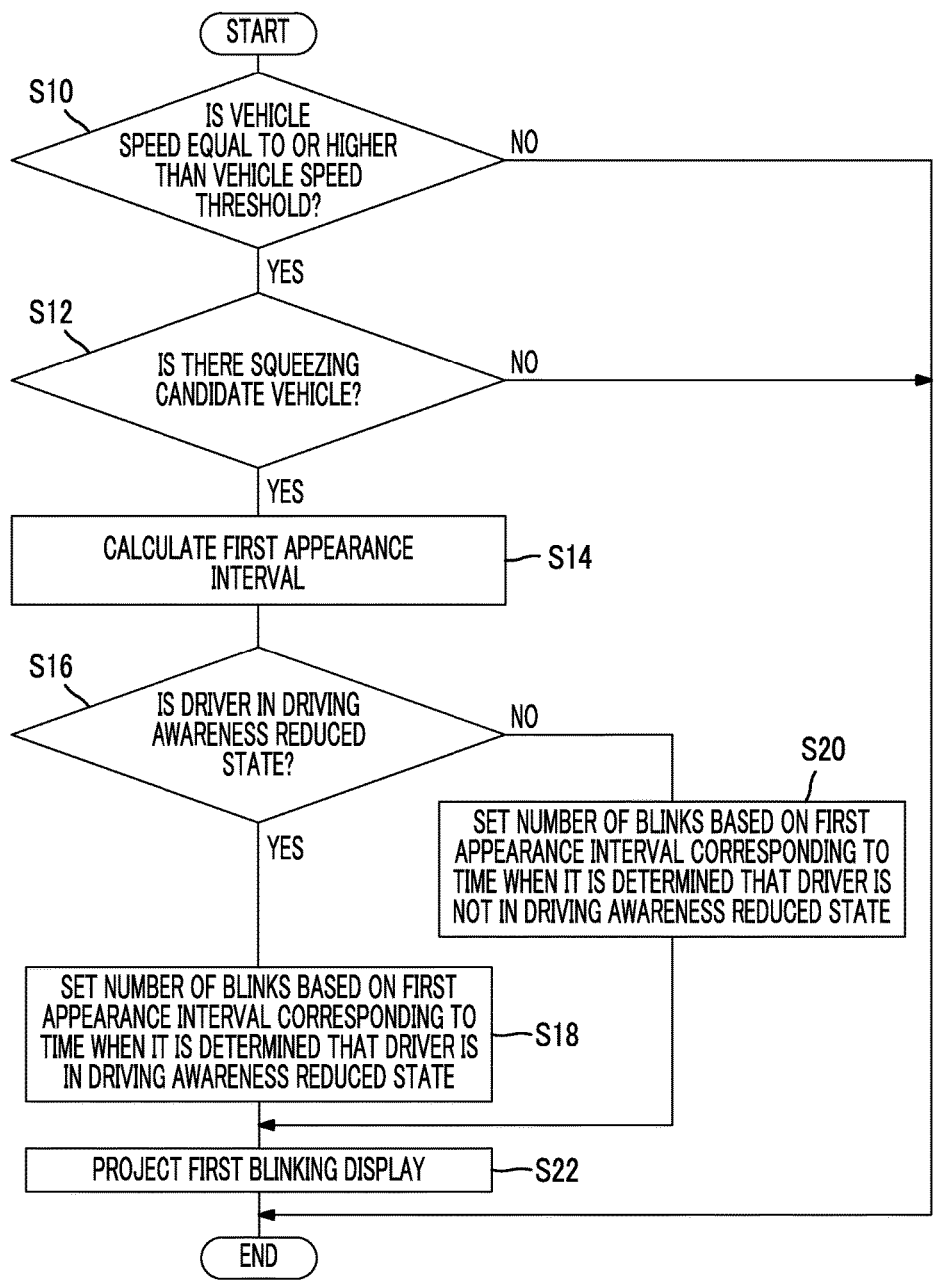
FIG. 9 is a flowchart showing the projection processing of the first blinking display.

The projection processing of the first blinking display Pa by the display device 100 in the first embodiment is described below. FIG. 9 is a flowchart showing the projection processing of the first blinking display. The flowchart shown in FIG. 9 is executed while the host vehicle M travels in the autonomous driving mode.

As shown in FIG. 9, the ECU 10 of the display device 100 uses the vehicle speed determination unit 13 in step S10 to determine whether the vehicle speed of the host vehicle M is equal to or higher than the vehicle speed threshold. Based on the vehicle speed information obtained by the vehicle speed sensor 4, the vehicle speed determination unit 13 determines whether the vehicle speed of the host vehicle M is equal to or higher than the vehicle speed threshold. If it is determined that the vehicle speed of the host vehicle M is not equal to or higher than the vehicle speed threshold (S10: NO), the ECU 10 terminates the current processing. After that, the ECU 10 repeats the processing again from S10 after the predetermined time elapses. If it is determined that the vehicle speed of the host vehicle M is equal to or higher than the vehicle speed threshold (S10: YES), the processing of the ECU 10 proceeds to S12.

In S12, the ECU 10 uses the squeezing candidate vehicle determination unit 14 to determine whether there is a squeezing candidate vehicle Na. Based on the recognition result of the other vehicle recognition unit 11, the squeezing candidate vehicle determination unit 14 determines whether there is a squeezing candidate vehicle Na. The squeezing candidate vehicle determination unit 14 determines that there is a squeezing candidate vehicle Na if the lateral distance between the other vehicle and the traveling lane R1 of the host vehicle M is equal to or smaller than the lateral distance threshold and if the relative speed between the other vehicle and the host vehicle M is equal to or smaller than the relative speed threshold.

If it is determined that there is no squeezing candidate vehicle Na (S12: NO), the ECU 10 terminates the current processing. After that, the ECU 10 repeats the processing again from S10 after the predetermined time elapses. If it is determined that there is a squeezing candidate vehicle Na (S12: YES), the processing of the ECU 10 proceeds to S14.

In step S14, the ECU 10 uses the appearance interval calculation unit 16 to calculate the first appearance interval Ti. The appearance interval calculation unit 16 calculates the first appearance interval Ti corresponding to the time elapsed from the time it was last determined that there was a squeezing candidate vehicle Na. After that, the processing of the ECU 10 proceeds to S16. Note that, if it is determined that there is a squeezing candidate vehicle Na for the first time after the engine of the host vehicle M was started, the appearance interval calculation unit 16 does not calculate the first appearance interval Ti. In this case, the ECU 10 terminates the current processing. After that, the ECU 10 repeats the processing again from S10 after the predetermined time elapses.

In S16, the ECU 10 uses the driver status determination unit 17 to determine whether the driver is in the driving awareness reduced state. Based on the image captured by the driver monitor camera 3, the driver status determination unit 17 determines whether the driver is in the driving awareness reduced state. If it is determined that the driver is in the driving awareness reduced state (S16: YES), the processing of the ECU 10 proceeds to S18. If it is determined that the driver is not in the driving awareness reduced state (S16: NO), the processing of the ECU 10 proceeds to S20.

In S18, the ECU 10 uses the display control unit 18 to set the number of blinks Ni based on the first appearance interval Ti corresponding to the time when the driver is in the driving awareness reduced state. When the first appearance interval Ti is smaller than the threshold T10, the display control unit 18 reduces the number of blinks Ni of the first blinking display Pa as compared with the case when the first appearance interval Ti is equal to or larger than the threshold T10. When the first appearance interval Ti is smaller than the threshold T11, the display control unit 18 reduces the number of blinks Ni of the first blinking display Pa as compared with the case when the first appearance interval Ti is equal to or larger than the threshold T11. When the first appearance interval Ti is smaller than the threshold T12, the display control unit 18 reduces the number of blinks Ni of the first blinking display Pa as compared with the case when the first appearance interval Ti is equal to or larger than the threshold T12. When the first appearance interval Ti is smaller than the threshold T13, the display control unit 18 reduces the number of blinks Ni of the first blinking display Pa as compared with the case when the first appearance interval Ti is equal to or larger than the threshold T13. After setting the number of blinks Ni of the first blinking display Pa, the processing of the ECU 10 proceeds to S22.

In S20, the ECU 10 uses the display control unit 18 to set the number of blinks Ni based on the first appearance interval Ti corresponding to the time when the driver is not in the driving awareness reduced state. When the first appearance interval Ti is smaller than the threshold T10, the display control unit 18 reduces the number of blinks Ni of the first blinking display Pa as compared with the case when the first appearance interval Ti is equal to or larger than the threshold T10. The same is true for the thresholds T11 to T13. In addition, the display control unit 18 reduces the number of blinks Ni as compared with the case in S18 (the case when the driver is in the driving awareness reduced state). After setting the number of blinks Ni of the first blinking display Pa, the processing of the ECU 10 proceeds to S22.

In S22, the ECU 10 uses the display control unit 18 to project the first blinking display Pa. The display control unit 18 projects the first blinking display Pa obliquely below the image of the squeezing candidate vehicle Na on the windshield W in the display outer frame C1 (below the image and nearer to the traveling lane R1). The display control unit 18 projects the first blinking display Pa on the windshield W until the number of blinks reaches the number of blinks Ni. After that, the ECU 10 terminates the current processing and, after the predetermined time elapses, repeats the processing again from S10.

When the display control unit 18 sets the number of blinks Ni to zero, the ECU 10 terminates the current processing without projecting the first blinking display Pa in S22. In addition, if there are squeezing candidate vehicles Na on the left and right sides of the host vehicle M, the display control unit 18 projects the first blinking display Pa for each of the left and right squeezing candidate vehicles Na.

<Projection Processing of the Second Blinking Display by the Display Device>

The projection processing of the second blinking display Pb by the display device 100 in the first embodiment is described below. FIG. 10 is a flowchart showing the projection processing of the second blinking display. The flowchart shown in FIG. 10 is executed while the host vehicle M travels in the autonomous driving mode.

As shown in FIG. 10, the ECU 10 of the display device 100 uses the vehicle speed determination unit 13 in step S30 to determine whether the vehicle speed of the host vehicle M is equal to or higher than the vehicle speed threshold. The processing in S30 is the same as that in S10 in FIG. 9. If it is determined that the vehicle speed of the host vehicle M is not equal to or higher than the vehicle speed threshold (S30: NO), the ECU 10 terminates the current processing. After that, the ECU 10 repeats the processing again from S30 after the predetermined time elapses. If it is determined that the vehicle speed of the host vehicle M is equal to or higher than the vehicle speed threshold (S30: YES), the processing of the ECU 10 proceeds to S32.

In S32, the ECU 10 uses the preceding vehicle determination unit 15 to determine whether there is a preceding vehicle Nb whose deceleration is equal to or larger than the deceleration threshold. The preceding vehicle determination unit 15 determines whether there is a preceding vehicle Nb whose deceleration is equal to or larger than the deceleration threshold, based on the recognition result of the other vehicle recognition unit 11. If it is determined that there is no preceding vehicle Nb that satisfies the condition described above (S32: NO), the ECU 10 terminates the current processing. After that, the ECU 10 repeats the processing again from S30 after the predetermined time elapses. If it is determined that there is a preceding vehicle Nb that satisfies the condition described above (S32: YES), the processing of the ECU 10 proceeds to S34.

In step S34, the ECU 10 uses the appearance interval calculation unit 16 to calculate the second appearance interval Tj. The appearance interval calculation unit 16 calculates the second appearance interval Tj corresponding to the time elapsed from the time it was last determined that there was a preceding vehicle Nb whose deceleration is equal to or larger than the deceleration threshold. After that, the processing of the ECU 10 proceeds to S36. Note that, if it is determined that there is a preceding vehicle Nb, whose deceleration is equal to or larger than the deceleration threshold, for the first time after the engine of the host vehicle M was started, the appearance interval calculation unit 16 does not calculate the second appearance interval Tj. In this case, the ECU 10 terminates the current processing. After that, the ECU 10 repeats the processing again from S30 after the predetermined time elapses.

In S36, the ECU 10 uses the driver status determination unit 17 to determine whether the driver is in the driving awareness reduced state. Based on the image captured by the driver monitor camera 3, the driver status determination unit 17 determines whether the driver is in the driving awareness reduced state. If it is determined that the driver is in the driving awareness reduced state (S36: YES), the processing of the ECU 10 proceeds to S38. If it is determined that the driver is not in the driving awareness reduced state (S36: NO), the processing of the ECU 10 proceeds to S40.

In S38, the ECU 10 uses the display control unit 18 to set the number of blinks Nj based on the second appearance interval Tj corresponding to the time when the driver is in the driving awareness reduced state. When the second appearance interval Tj is smaller than the threshold T20, the display control unit 18 reduces the number of blinks Nj of the second blinking display Pb as compared with the case when the second appearance interval Tj is equal to or larger than the threshold T20. When the second appearance interval Tj is smaller than the threshold T21, the display control unit 18 reduces the number of blinks Nj of the second blinking display Pb as compared with the case when the second appearance interval Tj is equal to or larger than the threshold T21. When the second appearance interval Tj is smaller than the threshold T22, the display control unit 18 reduces the number of blinks Nj of the second blinking display Pb as compared with the case when the second appearance interval Tj is equal to or larger than the threshold T22. When the second appearance interval Tj is smaller than the threshold T23, the display control unit 18 reduces the number of blinks Nj of the second blinking display Pb as compared with the case when the second appearance interval Tj is equal to or larger than the threshold T23. After setting the number of blinks Nj of the second blinking display Pb, the processing of the ECU 10 proceeds to S42.

In S40, the ECU 10 uses the display control unit 18 to set the number of blinks Nj based on the second appearance interval Tj corresponding to the time the driver is not in the driving awareness reduced state. When the second appearance interval Tj is smaller than the threshold T20, the display control unit 18 reduces the number of blinks Nj of the second blinking display Pb as compared with the case when the second appearance interval Tj is equal to or larger than the threshold T20. The same is true for the thresholds T21 to T23. In addition, the display control unit 18 reduces the number of blinks Nj as compared with the case in S38 (the case when the driver is in the driving awareness reduced state). After setting the number of blinks Nj of the second blinking display Pb, the processing of the ECU 10 proceeds to S42.

In S42, the ECU 10 uses the display control unit 18 to project the second blinking display Pb. The display control unit 18 projects the second blinking display Pb below the image of the preceding vehicle Nb on the windshield W in the display outer frame C1. The display control unit 18 projects the second blinking display Pb on the windshield W until the number of blinks reaches the number of blinks Nj. After that, the ECU 10 terminates the current processing and, after the predetermined time elapses, repeats the processing again from S30.

When the display control unit 18 sets the number of blinks Nj to zero, the ECU 10 terminates the current processing without projecting the second blinking display Pb in S42.

<Operational Effects of the Display Device in the First Embodiment>

Figure 11A:
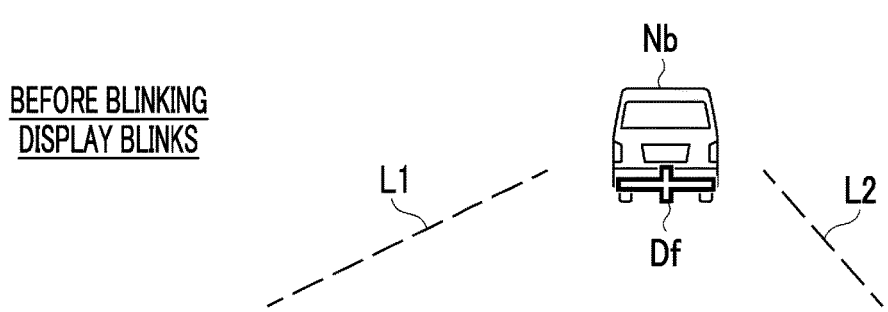
FIG. 11A is a diagram showing the state before the first blinking display blinks.
Figure 11B:
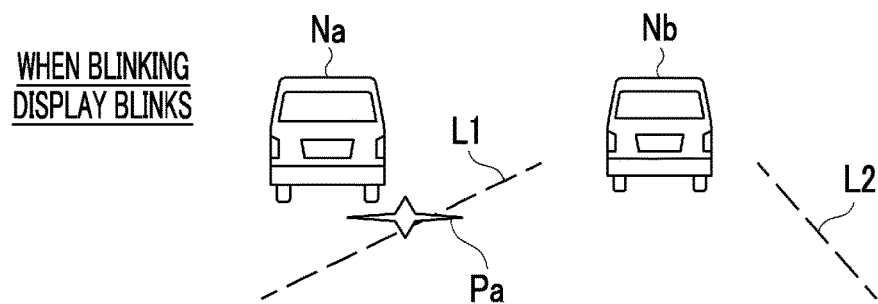
FIG. 11B is a diagram showing the state when the first blinking display blinks.
Figure 11C:
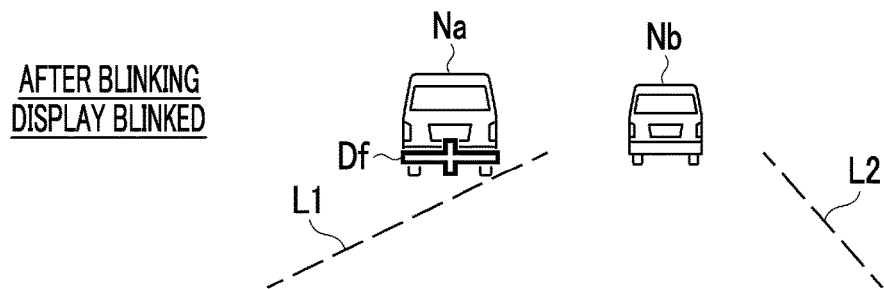
FIG. 11C is a diagram showing the state after the first blinking display blinked.

If it is determined that there is a squeezing candidate vehicle Na that may squeeze before the host vehicle M, the display device 100 in the first embodiment described above projects the first blinking display Pa on the windshield W to alert the driver to the squeezing candidate vehicle Na, thus preventing the driving awareness of the driver from being reduced. FIG. 11A is a diagram showing the state before the first blinking display Pa blinks. In FIG. 11A, the attention point Df, to which the driver pays attention, is indicated. As shown in FIG. 11A, the driver pays attention to the preceding vehicle Nb before the first blinking display Pa blinks (before the first blinking display Pa is projected). FIG. 11B is a diagram showing the state when the first blinking display Pa blinks. As shown in FIG. 11B, when a squeezing candidate vehicle Na appears, the first blinking display Pa is projected on the windshield W of the host vehicle M. FIG. 11C is a diagram showing the state after the first blinking display Pa blinked. As shown in FIG. 11C, the attention of the driver is directed to the first blinking display Pa, with the result that the attention point Df of the driver moves to the squeezing candidate vehicle Na that is traveling near the traveling lane R1. In this way, the display device 100 can alert the driver to the presence of the squeezing candidate vehicle Na.

In addition, if it is determined that there is a squeezing candidate vehicle Na, the display device 100 projects the first blinking display Pa on the windshield W. Projecting the first blinking display Pa in this way reduces the possibility that the driver feels bothersome as compared with the conventional case in which the blinking display is projected at a constant periodic interval regardless of the surrounding environment of the host vehicle M. In addition, when the first appearance interval Ti of the squeezing candidate vehicle Na is smaller than the first threshold (for example, thresholds T10 to T13), the display device 100 reduces the number of blinks Ni of the first blinking display Pa as compared with the case when the first appearance interval is equal to or larger than the first threshold. Therefore, when a squeezing candidate vehicle appears at short intervals, the display device 100 can reduce the stimulus that is given by the first blinking display Pa to the driver, thus reducing the possibility that the first blinking display Pa makes the driver feel bothersome.

In addition, if it is determined that, before the host vehicle M, there is a preceding vehicle Nb whose deceleration is equal to or larger than the deceleration threshold, the display device 100 projects the second blinking display Pb on the windshield W to alert the driver to the preceding vehicle Nb, thus preventing the driving awareness of the driver from being reduced. Furthermore, if it is determined that there is a preceding vehicle Nb that satisfies the condition described above, the display device 100 projects the second blinking display Pb on the windshield W. Projecting the second blinking display Pb on the windshield W in this way reduces the possibility that the driver feels bothersome as compared with the conventional case in which the blinking display is projected at a constant periodic interval regardless of the surrounding environment of the host vehicle M. In addition, when the second appearance interval Tj of the preceding vehicle Nb is smaller than the second threshold (for example, thresholds T20 to T23), the display device 100 reduces the number of blinks Nj of the second blinking display Pb as compared with the case when the second appearance interval Tj is equal to or larger than the second threshold. Therefore, when the deceleration of the preceding vehicle Nb occurs frequently, the display device 100 can reduce the stimulus that is given by the second blinking display Pb to the driver, thus reducing the possibility that the second blinking display Pb makes the driver feel bothersome.

Furthermore, if it is determined that the driver is not in the driving awareness reduced state, the display device 100 reduces the number of blinks Ni of the first blinking display Pa. By doing so, the display device 100 avoids the first blinking display Pa from giving an excessive stimulus to the driver who is well aware of driving the host vehicle M, thereby reducing the possibility that the first blinking display Pa makes the driver feel bothersome. Similarly, if it is determined that the driver is not in the driving awareness reduced state, the display device 100 reduces the number of blinks Nj of the second blinking display Pb. By doing so, the display device 100 avoids the second blinking display Pb from giving an excessive stimulus to the driver who is well aware of driving the host vehicle M, thereby reducing the possibility that the second blinking display Pb makes the driver feel bothersome.

Figure 12:
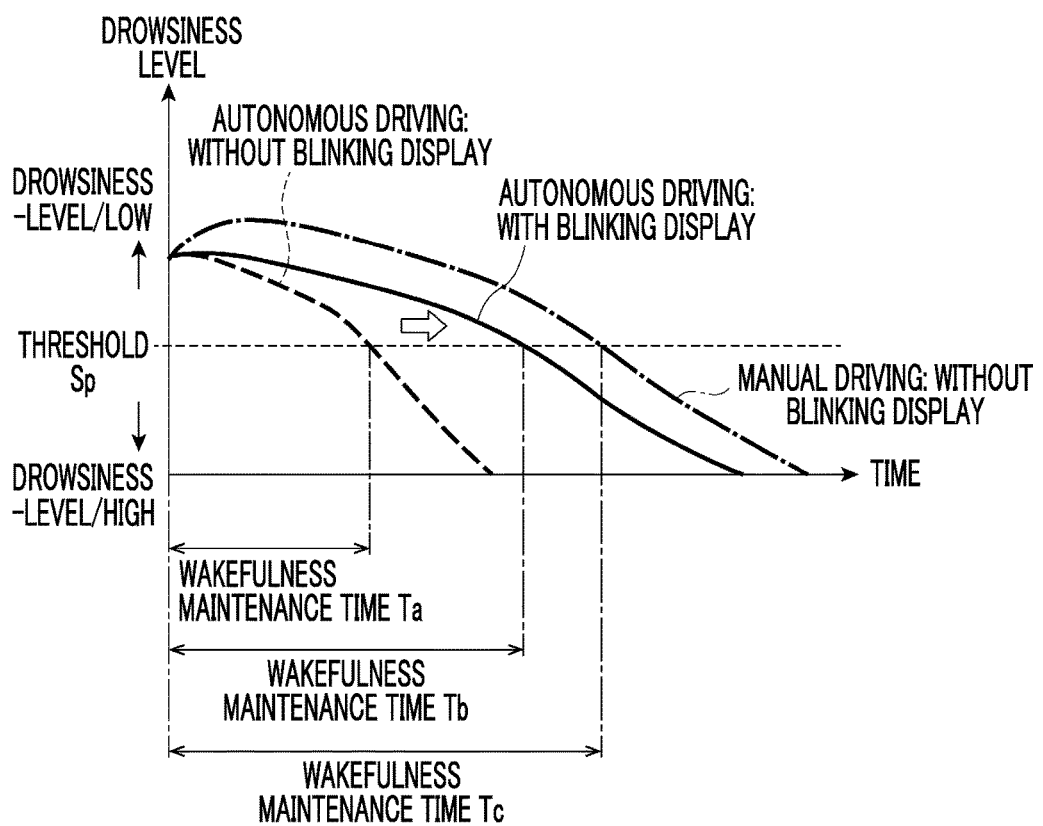
FIG. 12 is a graph showing the relation between the drowsiness level of the driver and the time.

FIG. 12 is a graph showing the relation between the drowsiness level of a driver and the time. In FIG. 12, the vertical axis indicates the drowsiness level of the driver, and the horizontal axis indicates the time. The higher the drowsiness level is, the lower the driving awareness of the driver is. In FIG. 12, the broken line indicates a change in the drowsiness level over time when the blinking display P (first blinking display Pa, second blinking display Pb) is not shown on windshield W of host vehicle M that is traveling in the autonomous driving mode (autonomous driving: without blinking display). Similarly, the solid line indicates a change in the drowsiness level over time when the blinking display P is shown on the windshield W of host vehicle M that is traveling in the autonomous driving mode (autonomous driving: with blinking display). In addition, the dashed line indicates a change in the drowsiness level over time when the blinking display P is not shown on windshield W of host vehicle M that is driven by the driver in the manual driving mode (manual driving: without blinking display). In this description, it is assumed that the host vehicle M in the manual driving mode travels on a road of simple shape that requires almost no driving operation.

FIG. 12 shows the threshold Sp, wakefulness maintenance time Ta, wakefulness maintenance time Tb, and wakefulness maintenance time Tc of the drowsiness level. The threshold Sp is a pre-set threshold that is the criterion for determining an increase in the drowsiness level of the driver (a decrease in the wakefulness). The wakefulness maintenance time Ta is the length of time that elapses until the drowsiness level falls below the threshold Sp when traveling in the mode indicated by "autonomous driving: without blinking display". The wakefulness maintenance time Tb is the length of time that elapses until the drowsiness level falls below threshold Sp when traveling in the mode indicated by "autonomous driving: with blinking display". The wakefulness maintenance time Tc is the length of time that elapses until the drowsiness level falls below threshold Sp when traveling in the mode indicated by "manual driving: without blinking display".

As shown in FIG. 12, the wakefulness maintenance time Ta and the wakefulness maintenance time Tb during autonomous driving are shorter than the wakefulness maintenance time Tc during manual driving. This means that the drowsiness level of the driver is more likely to increase during autonomous driving (the wakefulness degree tends to decrease) than during manual driving. In addition, during autonomous driving, the wakefulness maintenance time Tb with a blinking display is longer than wakefulness maintenance time Ta without a blinking display. As described above, the display device 100 gives a visual stimulus to the driver by projecting the blinking display P to make the drowsiness level of the driver less likely to reduce and to extend the wakefulness maintenance time.

For how to extend the wakefulness maintenance time of a driver by visual stimuli such as a blinking display, refer to Reference 1 and Reference 2 given below:
Reference 1: Yasuhiro Seya, Ken-Ichiro Tsutsui, Katsumi Watanabe, and Kenji Kimura 2012 Attentional Capture without Awareness in Complex Visual Tasks, Perception, volume 41, pages 517-531
Reference 2: Kazuma Ishimatsu, Toshiaki Miura, March, 2002 "Influence of Aging on the Effective View: With Focus on Traffic Safety" Bulletin of the Graduate School of Human Sciences, Osaka University Vol. 28

On page 9 of Reference 1, the document describes that associating a weak blinking display (subthreshold), which is below the awareness level, with a peripheral target (a target outside the central visual field of a subject) produces an effect that the subject can easily notice the peripheral target even when the subject is in the central vision state. The central vision state refers to the state in which the subject is closely watching a position within the central visual field (discrimination visual field). The central visual field is the range in which the subject looks at a target carefully and can visually recognize the target accurately without largely moving the eyeball. The central visual field is, for example, a circular range with an upper and lower depression angle of 5° and a lateral angle of ±5°.

In addition, on the same page, the document describes the following. The effect of enabling a subject to easily notice a peripheral target by a blinking display becomes larger when, as viewed from the subject who is in the central vision state, the direction of the blinking display and the direction of the peripheral target match than when they do not match. This means that, even in a scene in which the driver is driving the host vehicle in the autonomous driving mode while carefully looking ahead, a weak blinking display, if shown, allows the driver to easily notice a change in the surrounding traveling environment according to a change in the traveling environment. Therefore, a weak blinking display makes it possible to broaden the effective field of view of the driver and, therefore, prevents the driving awareness during autonomous driving from being reduced. Thus, the wakefulness maintenance time, almost equal to that during manual driving, can be realized also during autonomous driving. The display device 100 may adopt a weak blinking display (subthreshold) as the blinking display P.

Second Embodiment

Figure 13:
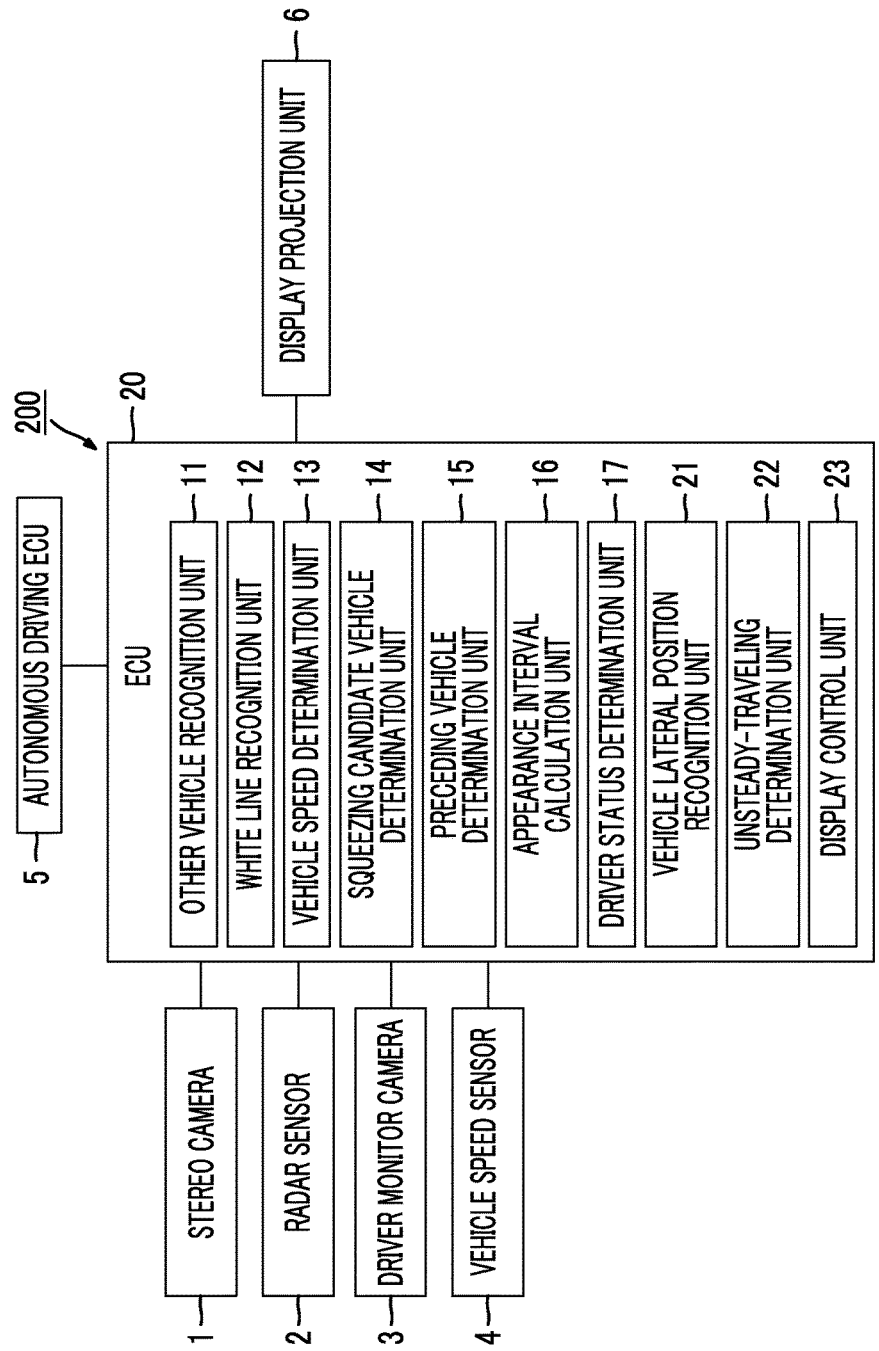
FIG. 13 is a block diagram showing a display device in a second embodiment.

Next, a display device 200 in a second embodiment is described. FIG. 13 is a block diagram showing the display device 200 in the second embodiment. In addition to the function of the display device 100 in the first embodiment, the display device 200 in the second embodiment has the function of projecting a blinking display on the windshield W when the unsteady-traveling state of the host vehicle occurs. In the second embodiment, the same reference numeral is used for a configuration that is the same as, or equivalent to, that in the first embodiment and the duplicated description thereof is omitted.

As shown in FIG. 13, an ECU 20 of the display device 200 further includes a vehicle lateral position recognition unit 21 and an unsteady-traveling determination unit 22 in addition to the functional configuration of the ECU 10 in the first embodiment.

The vehicle lateral position recognition unit 21 recognizes the lateral position of the host vehicle M using a known image processing method, based on the image (white line image) captured by the stereo camera 1. The lateral position of the host vehicle M refers to the position of the host vehicle M in the lane width direction of the traveling lane R1 in which the host vehicle M travels. The mounting position of the stereo camera 1 in the host vehicle M is fixed and, in addition, the range that is captured by the stereo camera 1 from this mounting position is fixed. In addition, the positional relation (the positional relation in the planar view) between the mounting position of the stereo camera 1 and the center position of the host vehicle M is fixed. Therefore, the vehicle lateral position recognition unit 21 can find the center position of the host vehicle M (lateral position of the vehicle M) in the lane width direction, based on the positions of the two white lines L1 and L2 (left and right) in the image captured by the stereo camera 1. The vehicle lateral position recognition unit 21 may recognize the lateral position of the host vehicle M as the shift amount (deviation amount) of the center position of the host vehicle M with respect to the center of the lane (the position equal in distance from the two white lines (left and right)).

Based on the lateral position of the host vehicle M recognized by the vehicle lateral position recognition unit 21, the unsteady-traveling determination unit 22 determines whether the host vehicle M has approached one of the left and right white lines L1 and L2 of the traveling lane R1. When the lateral distance between the white line L1 and the host vehicle M is equal to or smaller than the approach threshold, the unsteady-traveling determination unit 22 determines that the host vehicle M has approached the white line L1. When the lateral distance between the white line L2 and the host vehicle M is equal to or smaller than the approach threshold, the unsteady-traveling determination unit 22 determines that the host vehicle M has approached the white line L2. The approach threshold is a threshold that is set in advance. The approach threshold may be a value that is changed according to the lane width of the traveling lane R1.

If the unsteady-traveling determination unit 22 determines that the host vehicle M has approached one of the left and right white lines L1 and L2, the display control unit 23 projects a third blinking display on the windshield W. The third blinking display is a blinking display for alerting the driver to the white line that the host vehicle M has approached.

Figure 14A:
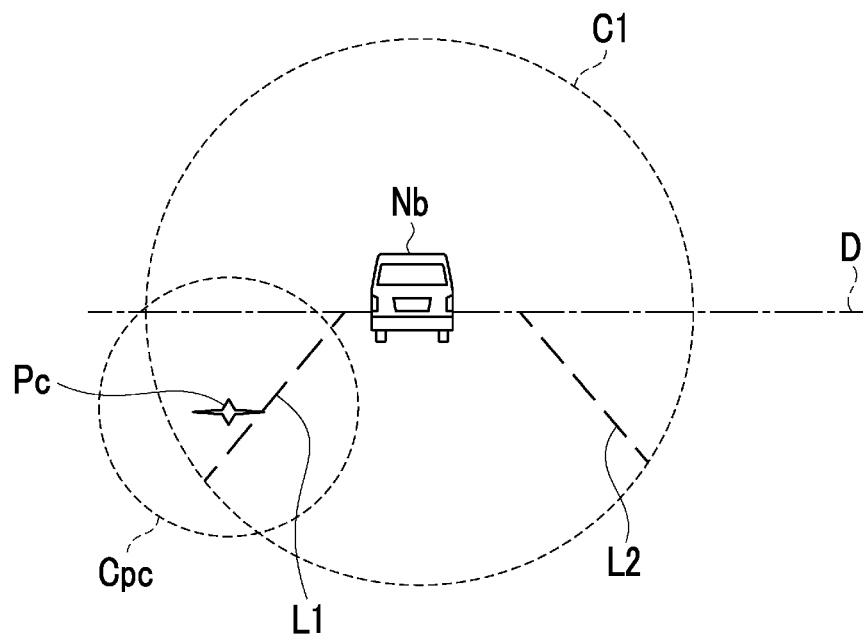
FIG. 14A is a diagram showing a third blinking display that is projected when the host vehicle has approached the left white line.

FIG. 14A is a diagram showing the third blinking display Pc that is projected when the host vehicle M has approached the left white line L1. FIG. 14A shows the third blinking display Pc and the attention attraction range Cpd of the third blinking display Pc. The attention attraction range Cpd is the range to which the attention (line of sight) of the driver, who has been looking ahead by tracking the third blinking display Pc, is attracted. The attention attraction range Cpd is a circular range of a fixed size on the windshield W with the center at the third blinking display Pc.

If it is determined that the host vehicle M has approached the left white line L1 as shown in FIG. 14A, the display control unit 23 recognizes the white line L1 on windshield W, as seen by the driver from the driver eye point Ep, based on the recognition result of the white line recognition unit 12. The display control unit 23 projects the third blinking display Pc in the display outer frame C1 so that a part of the white line L1 is included in the attention attraction range Cpd.

Figure 14B:
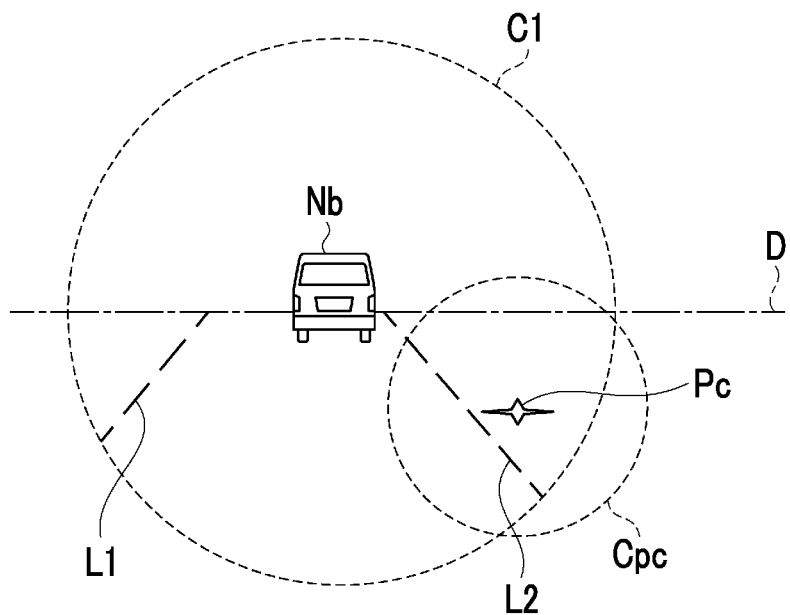
FIG. 14B is a diagram showing the third blinking display that is projected when the host vehicle has approached the right white line.

FIG. 14B is a diagram showing the third blinking display Pc that is projected when the host vehicle M has approached the right white line L2. If it is determined that the host vehicle M has approached the right white line L2 as shown in FIG. 14B, the display control unit 23 recognizes the white line L2 on windshield W, as seen by the driver from the driver eye point Ep, based on the recognition result of the white line recognition unit 12. The display control unit 23 projects the third blinking display Pc in the display outer frame C1 so that a part of the white line L2 is included in the attention attraction range Cpd.

The display control unit 23 does not necessarily need to recognize the white lines L1 and L2 on the windshield W as seen by the driver from the driver eye point Ep. The display control unit 23 may project the third blinking display Pc at a position on the windshield W that is set in advance.

The display control unit 23 changes the number of blinks of the third blinking display Pc according to the status of the driver. When it is determined by the driver status determination unit 17 that the driver is not in the driving awareness reduced state, the display control unit 23 reduces the number of blinks of the third blinking display Pc as compared with the case when it is determined that the driver is in the driving awareness reduced state. The display control unit 23 may store, as the preset values, the number of blinks in the case when it is determined that the driver is in the driving awareness reduced state and the number of blinks in the case when it is determined that the driver is not in the driving awareness reduced state.

<Projection Processing of the Third Blinking Display by the Display Device>

Figure 15:
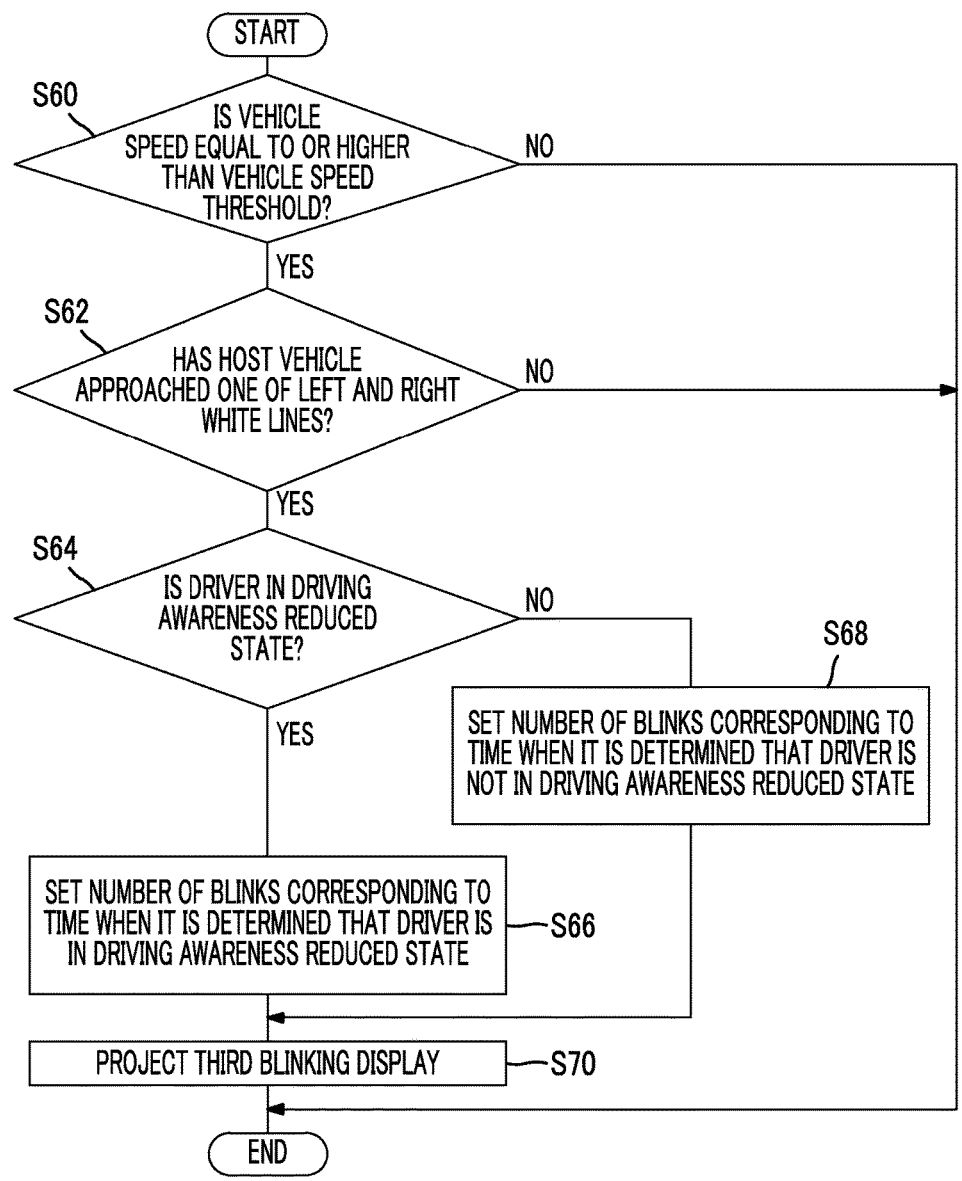
FIG. 15 is a flowchart showing the projection processing of the third blinking display.

The projection processing of the third blinking display Pc by the display device 200 in the second embodiment is described below. FIG. 15 is a flowchart showing the projection processing of the third blinking display. The flowchart shown in FIG. 15 is executed when the host vehicle M is traveling in the autonomous driving mode.

As shown in FIG. 15, the ECU 20 of the display device 200 uses the vehicle speed determination unit 13 in S60 to determine whether the vehicle speed of the host vehicle M is equal to or higher than the vehicle speed threshold. Based on the vehicle speed information obtained by the vehicle speed sensor 4, the vehicle speed determination unit 13 determines whether the vehicle speed of the host vehicle M is equal to or higher than the vehicle speed threshold. The vehicle speed determination unit 13 may set the vehicle speed threshold in the first embodiment and the vehicle speed threshold in the second embodiment as the values that are different from each other.

If it is determined that the vehicle speed of the host vehicle M is not equal to or higher than the vehicle speed threshold (S60: NO), the ECU 20 terminates the current processing. After that, the ECU 20 repeats the processing again from S60 after the predetermined time elapses. If it is determined that the vehicle speed of the host vehicle M is equal to or higher than the vehicle speed threshold (S60: YES), the processing of the ECU 20 proceeds to S62.

In S62, the ECU 20 uses the unsteady-traveling determination unit 22 to determine whether the host vehicle M has approached one of the left and right white lines L1 and L2 of the traveling lane R1. The unsteady-traveling determination unit 22 determines whether the host vehicle M has approached one of the white lines L1 and L2, based on the lateral position of the host vehicle M recognized by the vehicle lateral position recognition unit 21. If it is determined that the host vehicle M has approached neither of the white lines L1 and L2 (S62: NO), the ECU 20 terminates the current processing. After that, the ECU 20 repeats the processing again from S60 after the predetermined time elapses. If it is determined that the host vehicle M has approached one of the white lines L1 and L2 (S62: YES), the processing of the ECU 20 proceeds to S64.

In S64, the ECU 20 uses the driver status determination unit 17 to determine whether the driver is in the driving awareness reduced state. Based on the image captured by the driver monitor camera 3, the driver status determination unit 17 determines whether the driver is in the driving awareness reduced state. If it is determined that the driver is in the driving awareness reduced state (S64: YES), the processing of the ECU 20 proceeds to S66. If it is determined that the driver is not in the driving awareness reduced state (S64: NO), the processing of the ECU 20 proceeds to S68.

In S66, the ECU 20 uses the display control unit 23 to set the number of blinks of the third blinking display Pc. The display control unit 23 sets the number of blinks corresponding to the time when it is determined that the driver is in the driving awareness returned state. After that, the processing of the ECU 20 proceeds to S70.

In S68, the ECU 20 uses the display control unit 23 to set the number of blinks of the third blinking display Pc. The display control unit 23 sets the number of blinks corresponding to the time when it is determined that the driver is not in the driving awareness reduced state. The number of blinks corresponding to the time when it is determined that the driver is not driving awareness reduced state is smaller than the number of blinks (number of blinks in the case of S66) corresponding to the time when it is determined that the driver is driving awareness reduced state. After that, the processing of the ECU 20 proceeds to S70.

In S70, the ECU 20 uses the display control unit 23 to project the third blinking display Pc. The display control unit 23 projects the third blinking display Pc in the display outer frame C1 so that a part of the white line that the host vehicle M has approached is included in the attention attraction range Cpd. The display control unit 18 projects the third blinking display Pc on windshield W until the number of blinks reaches the number of blinks that is set. After that, the ECU 20 terminates the current processing and repeats the processing again from S60 after the predetermined time elapses.

<Operational Effects of the Display Device in the Second Embodiment>

If it is determined that the host vehicle M wanders left and right and has approached one of the left and right white lines L1 and L2, the display device 200 in the second embodiment described above projects the third blinking display Pc on the windshield W to prevent the driving awareness of the driver from being reduced while alerting the driver to the white line that the host vehicle has approached.

While the embodiments of the present disclosure have been described above, it is to be understood that the present disclosure is not limited to the embodiments described above. The present disclosure can be implemented not only by the embodiments described above but also in a variety of modes in which various changes and modifications are added based on the knowledge of those skilled in the art.

Figure 16:
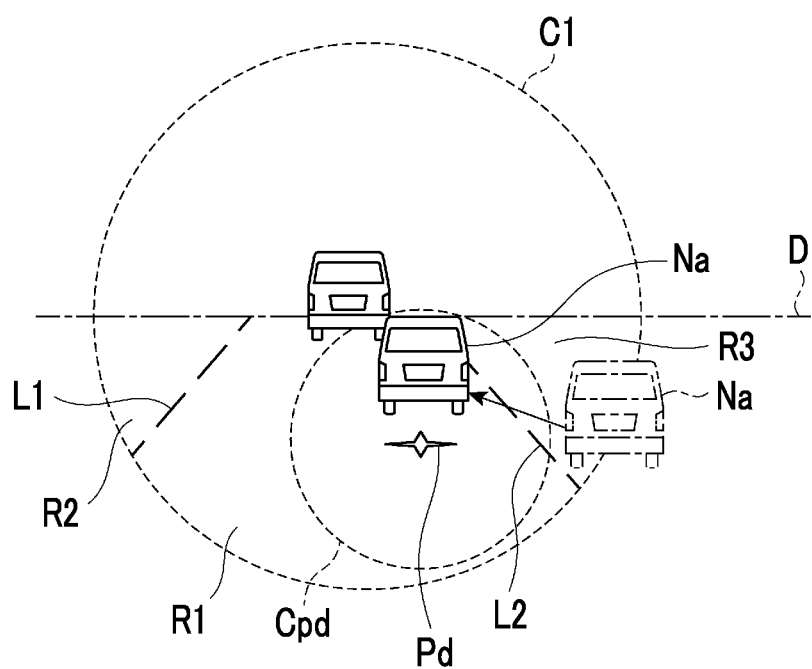
FIG. 16 is a diagram showing a blinking display after squeezing.

When a squeezing candidate vehicle Na has squeezed in, and entered, the traveling lane R1, the display device described above (display device 100, 200) may project an after-squeezing blinking display on the windshield W. FIG. 16 is a diagram showing the after-squeezing blinking display. FIG. 16 shows the after-squeezing blinking display Pd and the attention attraction range Cpc of the blinking display Pd. In FIG. 16, the squeezing candidate vehicle Na before squeezing is indicated by the broken line. The attention attraction range Cpc is the range to which the attention (line of sight) of the driver, who has been looking ahead while paying attention to the blinking display Pd, is attracted. The attention attraction range Cpc is the circular range of a fixed size on the windshield W with the center at the blinking display Pd.

Based on the recognition result of the other vehicle recognition unit 11 and the recognition result of the white line recognition unit 12, the display control unit 18 determines whether the squeezing candidate vehicle Na has entered the traveling lane R1. For example, the display control unit 18 determines that the squeezing candidate vehicle Na has entered the traveling lane R1 when the front wheels of the squeezing candidate vehicle Na have crossed and entered the white line L1 or the white line L2 of the traveling lane R1.

When it is determined that the squeezing candidate vehicle Na has entered the traveling lane R1, the display control unit 18 projects the blinking display Pd below the image of the squeezing candidate vehicle Na on the windshield W within the display outer frame C1 as seen by the driver sees from the driver eye point Ep. Since there is a strong need to alert the driver, the number of blinks of the after-squeezing blinking display Pd may be set larger than the number of blinks Ni of first blinking display Pa before the squeezing. Instead of increasing the number of blinks, the visual stimulus may be strengthened by making the blinking cycle shorter to make it easier for driver to notice the squeezing.

Figure 17:
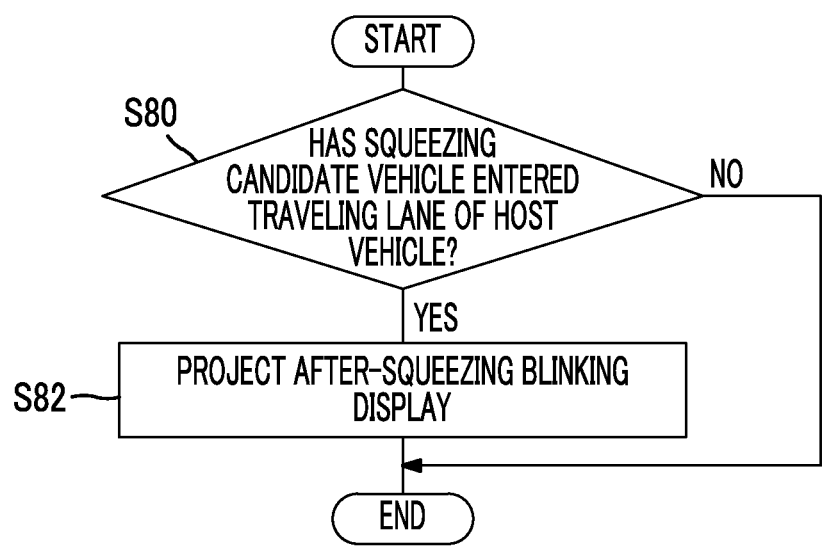
FIG. 17 is a flowchart showing the projection processing of a blinking display after squeezing.

FIG. 17 is a flowchart showing the projection processing of the after-squeezing blinking display. The flowchart shown in FIG. 17 is executed when the squeezing candidate vehicle determination unit 14 determines that there is a squeezing candidate vehicle Na.

In S80, the ECU 10 uses the display control unit 18 to determine whether the squeezing candidate vehicle Na has entered the traveling lane R1 of the host vehicle M. Based on the recognition result of the other vehicle recognition unit 11 and the recognition result of the white line recognition unit 12, the display control unit 18 determines whether the squeezing candidate vehicle Na has entered the traveling lane R1. If it is determined that the squeezing candidate vehicle Na has not entered the traveling lane R1 of the host vehicle M (S80: NO), the ECU 10 terminates the current processing. If the squeezing candidate vehicle determination unit 14 determines that there is a squeezing candidate vehicle Na, the ECU 10 repeats the processing of S80 again. If it is determined that the squeezing candidate vehicle Na has entered the traveling lane R1 of the host vehicle M (S80: YES), the processing of the ECU 10 proceeds to S82.

In S82, the ECU 10 uses the display control unit 18 to project the after-squeezing blinking display Pd. The display control unit 18 projects the blinking display Pd at the position below the image of the squeezing candidate vehicle Na. After that, the ECU 10 terminates the current processing. In this way, by projecting the blinking display Pd, the display device alerts the driver to the presence of the squeezing candidate vehicle Na after the squeezing, preventing the driving awareness of the driver from being reduced.

Figure 18A:
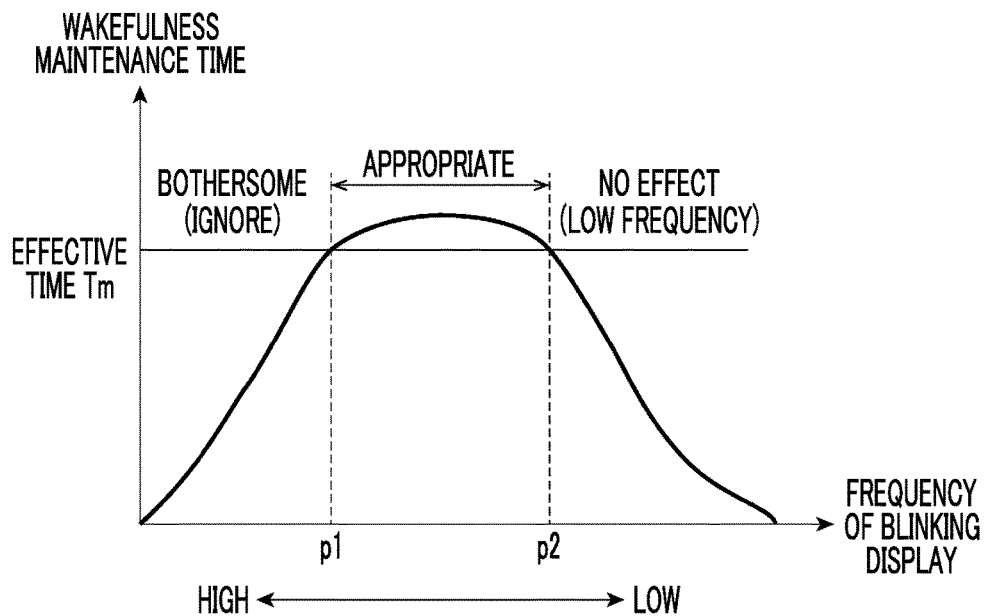
FIG. 18A is a graph showing the relation between the wakefulness maintenance time of the driver and the frequency of blinking displays.

The display device may also use the squeezing probability to determine whether there is a squeezing candidate vehicle Na. FIG. 18A is a graph showing the relation between the wakefulness maintenance time of the driver and the frequency of the blinking display. The vertical axis in FIG. 18A is the wakefulness maintenance time, and the horizontal axis is the frequency of the blinking display P. The wakefulness maintenance time is the time during which the driver can maintain the wakefulness state. The effective time Tm is shown in FIG. 18A. The effective time Tm is the threshold of the wakefulness maintenance that is assumed to be effective for preventing the driving awareness of the driver from being reduced. p1 and p2 shown in FIG. 18A are the frequencies of blinking display P where the wakefulness maintenance time crosses the effective time Tm.

As shown in FIG. 18A, if the frequency of the blinking display P is low (low frequency), the wakefulness maintenance time of the driver cannot be extended. As a result, the effect of preventing a reduction in the driving awareness cannot be sufficiently achieved. On the other hand, if the frequency of the blinking display P is high, the driver feels bothersome and ignores the blinking display P. Therefore, the wakefulness maintenance time cannot be extended and, as a result, the effect of preventing a reduction in the driving awareness cannot be sufficiently achieved. For this reason, to achieve a good effect, it is important to project the blinking display P on the windshield W at an appropriate frequency to give a visual stimulus to the driver.

Figure 18B:
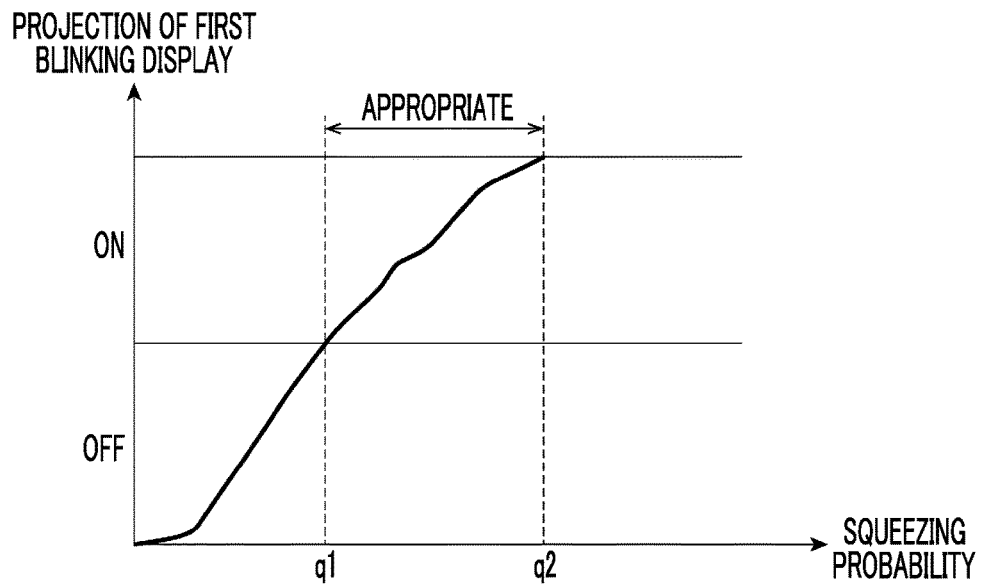
FIG. 18B is a graph showing the relation between the blinking display and the squeezing probability of another vehicle.

FIG. 18B is a graph showing the relation between the blinking display and the squeezing probability of another vehicle. The squeezing probability is an index indicating the possibility that another vehicle traveling in the adjacent lanes R2 and R3 will squeeze into the traveling lane R1. The squeezing candidate vehicle determination unit 14 calculates the squeezing probability of the other vehicle based on the lateral distance between the other vehicle and the traveling lane, the relative speed between the other vehicle and the host vehicle M, whether or not the blinker of the other vehicle is turned on, and the inter-vehicle distance between the host vehicle M and the preceding vehicle Nb.

The squeezing candidate vehicle determination unit 14 calculates the squeezing probability as a value that is higher as the lateral distance between the other vehicle and the traveling lane is smaller. The squeezing candidate vehicle determination unit 14 calculates the squeezing probability as a value that is higher as the relative speed between the other vehicle and the host vehicle M is closer to zero. When the blinker on the traveling lane R1 side of the other vehicle is turned on, the squeezing candidate vehicle determination unit 14 calculates the squeezing probability as a value that is higher as compared with the case when the blinker is turned off. The squeezing candidate vehicle determination unit 14 calculates the squeezing probability as a value that is lower as the inter-vehicle distance between the host vehicle M and the preceding vehicle Nb is smaller. The other vehicles for which the squeezing probability is calculated may be limited to the other vehicles traveling ahead of the host vehicle M.

As shown in FIG. 18B, the squeezing candidate vehicle determination unit 14 determines that there is a squeezing candidate vehicle Na when the squeezing probability of the other vehicle traveling in the adjacent lane is equal to or higher than the threshold q1. The display control unit 18 recognizes another vehicle having the squeezing probability equal to or higher than the threshold q1 as a squeezing candidate vehicle Na and, for that vehicle, projects the first blinking display Pa. Associating this threshold q1 with the threshold p1 in FIG. 18A makes it possible to realize the first blinking display Pa that is displayed at an appropriate frequency. The squeezing candidate vehicle determination unit 14 may determine whether there is a squeezing candidate vehicle Na only when there is a preceding vehicle Nb that is traveling ahead of the host vehicle M.

In addition, there is no need for the display device to limit the projection of the blinking display P only during autonomous driving. The host vehicle M need not be capable of traveling in autonomous driving mode. The display device may project the blinking display P for the squeezing candidate vehicle Na, for the preceding vehicle Nb, and for the white line that the host vehicle has approached, also during manual driving (including driving assistance in which the manual driving by the driver is mainly performed). In addition, even when the host vehicle M is traveling on a monotonous road that requires little driving operation, the blinking display P, if projected, alerts the driver by and, at the same time, prevents the driving awareness from being reduced. In this case, the flowcharts shown in FIGS. 9, 10, and 15 are executed when the host vehicle M is traveling.

In addition, if there is a preceding vehicle whose time to collision [TTC] with the host vehicle M is equal to or smaller than the TTC threshold, the display device may project the second blinking display Pb corresponding to that preceding vehicle instead of projecting the second blinking display Pb corresponding to a preceding vehicle Nb whose deceleration is equal to or larger than the deceleration threshold. The TTC threshold is a value that is set in advance. In this case, the preceding vehicle determination unit 15 determines whether there is a preceding vehicle whose time to collision with the host vehicle M is equal to or smaller than the TTC threshold. If it is determined that there is a preceding vehicle whose time to collision with the host vehicle M is equal to or smaller than the TTC threshold, the appearance interval calculation unit 16 calculates the second appearance interval Tj corresponding to the time elapsed from the time it was last determined that there was the preceding vehicle that satisfies the condition described above. If it is determined that there is a preceding vehicle whose time to collision with the host vehicle M is equal to or smaller than the TTC threshold, the display control unit 18 projects the second blinking display Pb for alerting the driver to that preceding vehicle.

The preceding vehicle determination unit 15 may determine whether there is a preceding vehicle whose time to collision with the host vehicle M is equal to or smaller than the TTC threshold and whose deceleration is equal to or smaller than the deceleration threshold. If it is determined that there is a preceding vehicle whose time to collision with the host vehicle M is equal to or smaller than the TTC threshold and whose deceleration is equal to or smaller than the deceleration threshold, the display control unit 18 projects the second blinking display Pb for alerting the driver to the preceding vehicle. In this case, the display device can avoid projecting the second blinking display for a preceding vehicle whose time to collision is long and for which an alert to the driver is not necessary.

The display device does not necessarily need to project second blinking display Pb. In this case, the display device need not have the preceding vehicle determination unit 15.

In addition, the display device does not necessarily need to determine the vehicle speed of the host vehicle M. The display device may project the blinking display P regardless of the vehicle speed of the host vehicle M. In this case, the display device does not necessarily need to include the vehicle speed sensor 4. In this case, S10 in FIG. 9, S30 in FIG. 10, and S60 in FIG. 15 are not necessary.

The display device may further reduce the number of blinks of the first blinking display Pa when the driver is in the concentration state in which the driver concentrates on the driving of the host vehicle M. In this case, the driver status determination unit 17 determines whether the driver is in the concentration state. FIG. 8C is a diagram showing another example of the relation between the eye closure duration of the driver and the number of blinks. FIG. 8C shows the eye closure duration threshold Tg0. The eye closure duration threshold Tg0 is a threshold that is set in advance for determining the concentration state of the driver. The concentration state can be determined during autonomous driving or during manual driving.

The driver status determination unit 17 determines that the driver is in the concentration state when the eye closure duration of the driver is shorter than the eye closure duration threshold Tg0. The driver status determination unit 17 determines that the driver is in the wakefulness state when the eye closure duration of the driver is equal to or longer than the eye closure duration threshold Tg0 and equal to shorter than the eye closure duration threshold Tg. When it is determined that the driver is in the concentration state, the display control unit 18 reduces the number of blinks of the first blinking display Pa as compared with the case when it is determined that the driver is not in the concentration state (the case when it is determined that the driver is in the wakefulness state or in the wakefulness reduced state). In this way, when the driver is in the concentration state, the display device 100 can reduce the possibility that the driver feels bothersome because of an excessive stimulus of the first blinking display Pa that is given to the driver. The same can be applied to the number of blinks of the second blinking display Pb and the third blinking display Pc.

The display device does not necessarily need to determine the driver status. In this case, the display device need not need to include the driver monitor camera 3 and the driver status determination unit 17. In this case, S16 and S20 are not necessary in FIG. 9 and, in S18, only number of blinks Ni is set based on first appearance interval Ti. Similarly, in FIG. 10, S36 and S40 are not necessary and, in S38, only the number of blinks Nj is set based on the second appearance interval Tj. In addition, in FIG. 15, S64, S66, and S68 are not necessary and, in S70, the third blinking display Pc is projected according to the number of blinks that is set in advance.

The display device may set number of blinks to the minimum of one. In this case, even if the first appearance interval Ti is smaller than the threshold T10, the display control unit 18 projects the first blinking display Pa with the number of blinks set to one. The same applies to the second blinking display Pb.

As the first appearance interval Ti corresponding to the time elapsed from the time it was last determined that there was a squeezing candidate vehicle Na, the appearance interval calculation unit 16 may adopt a time calculated by multiplying the time, elapsed from the time it was last determined that there was a squeezing candidate vehicle Na, by a predetermined coefficient. As the first appearance interval Ti, the appearance interval calculation unit 16 may adopt a time calculated by adding a predetermined value to the elapsed time described above.

Similarly, as the second appearance interval Tj corresponding to the time elapsed from the time it was last determined that there was a preceding vehicle Nb whose deceleration is equal to or larger than the deceleration threshold, the appearance interval calculation unit 16 may adopt a time calculated by multiplying the time, elapsed from the time it was last determined that there was a preceding vehicle Nb, by a predetermined coefficient. As the second appearance interval Tj, the appearance interval calculation unit 16 may adopt a time calculated by adding a predetermined value to the elapsed time described above.

What is claimed is:

1. A display device, comprising:
    a display unit configured to display an image on a windshield of a host vehicle; and
    an electronic control unit configured to recognize other vehicles that are present around the host vehicle;
        determine whether a squeezing candidate vehicle is present ahead of the host vehicle, based on a recognition result of the other vehicles, the squeezing candidate vehicle having a possibility to squeeze before the host vehicle;
        calculate a first appearance interval when the squeezing candidate vehicle is determined to be present, the first appearance interval being an interval that increases according to a time elapsed from a time when the squeezing candidate vehicle is last determined to present; and
        cause the display unit to display a first blinking display on the windshield when the squeezing candidate vehicle is determined to be present, the first blinking display being displayed to alert a driver of the host vehicle to the squeezing candidate vehicle, wherein
    the electronic control unit is configured to reduce a number of blinks of the first blinking display when the first appearance interval is smaller than a first threshold as compared with a case when the first appearance interval is equal to or larger than the first threshold, wherein
    the electronic control unit is configured to:
        determine whether a preceding vehicle whose deceleration is equal to or larger than a deceleration threshold before the host vehicle is present ahead of the host vehicle, based on the recognition result of the other vehicles;
        calculate a second appearance interval when the preceding vehicle is determined to be present, the second appearance interval being an interval that increases according to a time elapsed from a time when the preceding vehicle is last determined to present;
        cause the display unit to display a second blinking display on the windshield when the preceding vehicle is determined to be present, the second blinking display being displayed to alert the driver to the preceding vehicle; and
        reduce a number of blinks of the second blinking display when the second appearance interval is smaller than a second threshold as compared with a case when the second appearance interval is equal to or larger than the second threshold.

2. The display device according to claim 1, wherein the electronic control unit is configured to
    acquire an image captured by a camera, the camera being mounted on the host vehicle and configured to capture the driver;
    determine whether the driver is in a driving awareness reduced state, based on the captured image; and
    reduce the number of blinks of the first blinking display when the squeezing candidate vehicle is determined to be present and the driver is not determined to be in the driving awareness reduced state, as compared with a case when the driver is determined to be in the driving awareness reduced state.

3. The display device according to claim 1, wherein the electronic control unit is configured to
    acquire an image captured by a camera, the camera being mounted on the host vehicle and configured to capture the driver;
    determine whether the driver is in a driving awareness reduced state, based on the captured image; and
    reduce the number of blinks of the second blinking display when the preceding vehicle is determined to be present and the driver is not determined to be in the driving awareness reduced state as compared with a case when the driver is determined to be in the driving awareness reduced state.

4. The display device according to claim 1, wherein the electronic control unit is configured to
    recognize a lateral position, the lateral position being a position of the host vehicle in a lane width direction of a first traveling lane in which the host vehicle travels;
    determine whether the host vehicle has approached one of left and right white lines of the traveling lane, based on the lateral position; and
    cause the display unit to display a third blinking display on the windshield when the host vehicle is determined to approach one of the left and right white lines, the third blinking display being displayed to alert the driver to the white line that the host vehicle has approached.

5. The display device according to claim 1, wherein the electronic control unit is configured to determine whether an adjacent vehicle is the squeezing candidate vehicle based on a lane-width-direction distance between the adjacent vehicle and a first traveling lane in which the host vehicle travels, the adjacent vehicle being one of the other vehicles, and traveling in a second traveling lane adjacent to the first traveling lane.

6. The display device according to claim 5, wherein the electronic control unit is configured to display the first blinking display at a position that is below an image of the squeezing candidate vehicle on the windshield and that is nearer to the first traveling lane than the squeezing candidate vehicle.

7. The display device according to claim 5, wherein the electronic control unit is configured to predict a movement path of the squeezing candidate vehicle and to display the first blinking display on the predicted movement path.

8. The display device according to claim 1, wherein the electronic control unit is configured to display the second blinking display below an image of the preceding vehicle on the windshield.

* * * * *